US010695675B2

(12) United States Patent
Projansky

(10) Patent No.: US 10,695,675 B2
(45) Date of Patent: Jun. 30, 2020

(54) SYSTEM AND METHOD FOR CREATION AND CONTROL OF USER INTERFACES FOR INTERACTION WITH VIDEO CONTENT

(71) Applicant: Daniel Projansky, New York, NY (US)

(72) Inventor: Daniel Projansky, New York, NY (US)

( * ) Notice: Subject to any disclaimer, the term of this patent is extended or adjusted under 35 U.S.C. 154(b) by 0 days.

(21) Appl. No.: 15/940,893

(22) Filed: Mar. 29, 2018

(65) Prior Publication Data
US 2018/0280803 A1 Oct. 4, 2018

Related U.S. Application Data

(60) Provisional application No. 62/480,353, filed on Apr. 1, 2017.

(51) Int. Cl.
*A63F 9/24* (2006.01)
*A63F 13/63* (2014.01)
*A63F 13/2145* (2014.01)
*A63F 13/211* (2014.01)
*A63F 13/86* (2014.01)
*A63F 13/428* (2014.01)
*H04N 21/845* (2011.01)

(52) U.S. Cl.
CPC ............ *A63F 13/63* (2014.09); *A63F 13/211* (2014.09); *A63F 13/2145* (2014.09); *A63F 13/428* (2014.09); *A63F 13/86* (2014.09); *H04N 21/8456* (2013.01)

(58) Field of Classification Search
CPC .... A63F 13/211; A63F 13/2145; A63F 13/63; A63F 13/86; H04N 21/8456
See application file for complete search history.

(56) References Cited

U.S. PATENT DOCUMENTS 9,641,790 B2 5/2017 Stone et al.
9,808,724 B2 11/2017 Bala et al.
2009/0300475 A1* 12/2009 Fink .................. H04N 7/17318
715/230

(Continued)

OTHER PUBLICATIONS

International Search Report dated Jun. 22, 2018 in International Application No. PCT/US2018/025281.

(Continued)

*Primary Examiner* — Justin L Myhr
(74) *Attorney, Agent, or Firm* — FisherBroyles, LLP

(57) ABSTRACT

A system and method for creation of interactive user interfaces without software code authoring knowledge. The method involves recording of an author's input to a physical input device during, and in synchronization with, video content, which may be displayed to the author, or may be recorded or streamed. The timing, nature, and sequence of the user inputs define time-specific target inputs for a player during a gameplay session. During a gameplay/interaction session, the same video content is displayed to the player, and the player receives prompts to provide physical inputs to the player's device that match the physical inputs provided by the author to the author's device during the game creation session. The prompts may include a modified view of the video content in which the video content is displayed misaligned with a display screen of the player's device, or with a display surface of a display environment.

27 Claims, 15 Drawing Sheets

(56) References Cited

U.S. PATENT DOCUMENTS

| | | |
|---|---|---|
| 2010/0184497 A1 | 7/2010 | Cichowlas |
| 2012/0014673 A1 | 1/2012 | O'Dwyer |
| 2012/0058825 A1* | 3/2012 | Takehiro ............... A63F 13/493 463/37 |
| 2012/0094730 A1 | 4/2012 | Egozy |
| 2013/0094830 A1 | 4/2013 | Stone |
| 2013/0222229 A1* | 8/2013 | Kanda .................. G06F 3/1454 345/156 |
| 2016/0353168 A1* | 12/2016 | Allen ................. H04N 21/4627 |
| 2018/0101238 A1* | 4/2018 | Thomas-Brigden ......................... H04N 21/482 |

OTHER PUBLICATIONS

Written Opinion of the International Searching Authority dated Jun. 22, 2018 in International Application No. PCT/US2018/025281.
International Preliminary Report on Patentability dated Oct. 1, 2019, in International Application No. PCT/US2018/025281.

* cited by examiner

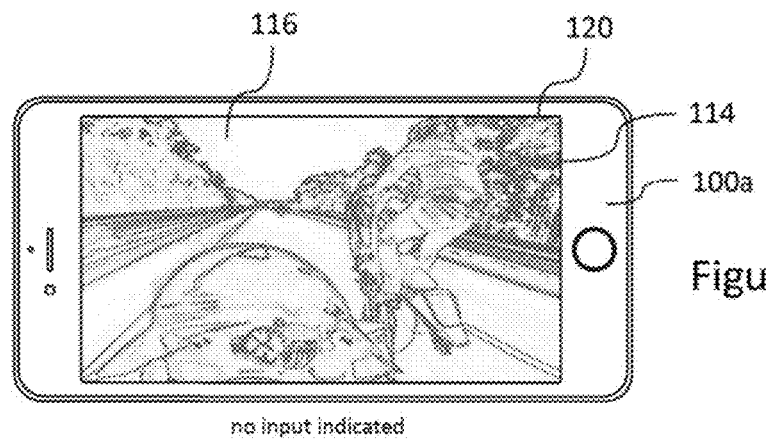
Figure 11A
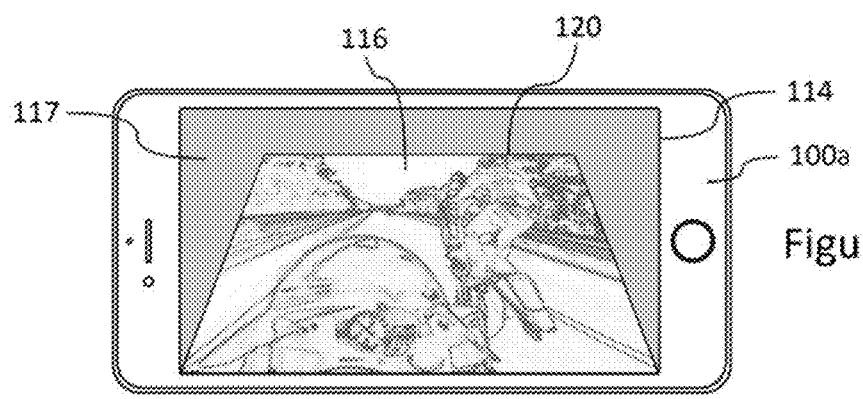
Figure 11B
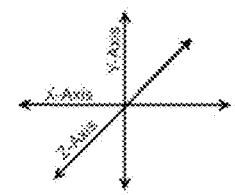
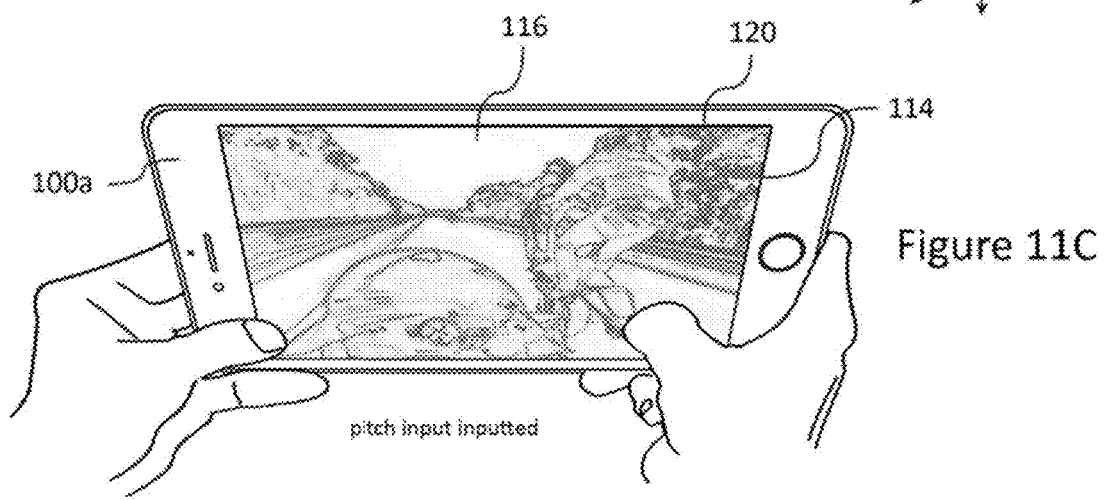
Figure 11C

SYSTEM AND METHOD FOR CREATION AND CONTROL OF USER INTERFACES FOR INTERACTION WITH VIDEO CONTENT

CROSS-REFERENCE TO RELATED APPLICATION

This application claims the benefit of U.S. Provisional Patent Application No. 62/480,353 filed Apr. 1, 2017, the entire disclosure of which is hereby incorporated herein by reference.

FIELD OF THE INVENTION

The present invention relates generally to computerized information systems, and more particularly to a system and method for creation of interactive user interfaces that are responsive to user engagement with displayed elements on the interface of a computerized device, and for controlling a user interface to prompt such user engagement.

DISCUSSION OF RELATED ART

In the field of computerized devices and computer-implemented interactive user interfaces, there are many technical challenges facing the designer of such interfaces when considering how the user interface is to be controlled in the context of computer devices available to access them. These technical challenges occur in the context of video games, as well as in other contexts involving user interfaces.

One technical challenge involves designing an interface that is fun and/or engaging, particularly when the interface is being displayed on a smartphone, tablet or other device with a relatively small display.

Another challenge is to make the interface simple to understand, yet also stimulating to the user.

Another technical challenge is creation of the software code that is required to implement a working interactive user interface, which typically requires extensive knowledge of sophisticated programming language and a significant investment of time in designing the interface/game, authoring the code, and debugging the code. Typical laypersons do not have such knowledge.

Currently it is possible to view linear videos (such as those commonly found on YouTube, Vimeo, and Netflix websites) on a variety of devices, such as smartphones, tablet PCs, handheld gaming systems, computers, digital media players, internet-connected TVs and video game consoles. Many of these devices also support the playing of interactive video games. Linear video content is easily generated using video cameras of smartphones, tablets, digital cameras and similar devices, and linear video content is widely available and accessible on the Internet/World Wide Web.

Linear videos and video games have been combined into interactive game-plus-video experiences in the past. However, previous combinations have relied on branching video, alternative non-linear paths (see, e.g., U.S. Patent Application Publication No. 2013/0094830), or pauses in the linear video sequences while interactive segments occur (or a combination of these approaches) in order to support interactivity.

What is needed is system and method for creation of interactive user interfaces that are responsive to user engagement with displayed elements on the interface of a computerized device, and yet do not require software code authoring knowledge. Further, what is needed is a system and method for controlling a user interface to prompt user engagement in a manner that is fun, engaging and/or simple to understand and that can be easily combined with linear videos. The present invention fulfills these needs, among others.

SUMMARY

The present invention provides systems and methods for creation of interactive user interfaces that are responsive to user engagement with displayed elements on the interface of a computerized device, and yet do not require software code authoring knowledge, and for controlling a user interface to prompt user engagement in a manner that is fun, engaging and/or simple to understand, and can be easily combined with linear videos.

Generally, in accordance with one embodiment of the present invention, the present invention provides an interface (e.g., game) authoring module that allows an author to create an interaction (e.g., game) user interface by simply interacting with the interface authoring system to provide physical inputs to the authoring system that correspond in direct fashion to the inputs to be provided by a user/player when using the interaction user interface, without the need for knowledge of or writing of software code. For example, the author may provide input by moving or tilting the interface authoring system, or by providing simple user input to the system's input devices—e.g., by touching a touchscreen, by moving a joystick, etc. The interface authoring module senses the user's physical inputs to the system and records them, along with their times of occurrence relative to an elapsed time of an associated video content segment. The sensed inputs of the author define target user inputs for a user/player to provide to the user's/player's system during a game/interaction session, the goal being for the user/player to match the target inputs defined by the author during the interface authoring session.

The sensed inputs may be recorded in a master track that includes data representing the inputs—such as spatial movement, acceleration or orientation inputs sensed by an accelerometer, gyroscope, magnetometer and/or camera, touchscreen inputs, keyboard inputs, joystick input, button inputs, etc.

During use of a user's (e.g., player's) interaction (e.g., gameplay) system, the user's system may interpret data from the master track to provide prompts to the user/player to provide the required input. In some embodiments, the prompts are displayed on a display screen of the user's system, as the result of the target user input data from the master track in view of real-time user input. In certain embodiments, the prompts are displayed in the form of a modified view of a video content segment in which the video content segment is shown misaligned with a video display surface or area of a physical video display screen or a virtual display environment. The user's system compares target user inputs defined by the data to the user's actual inputs during an interaction (e.g., gameplay) session and evaluates the user's interaction (e.g., gameplay) performance as a function of how well the actual inputs match the target input defined by the author.

BRIEF DESCRIPTION OF THE FIGURES

An understanding of the following description will be facilitated by reference to the attached drawings, in which:

FIGS. 11A-11C illustrate display of an exemplary interactive user interface responsive to pitch axis user prompts and inputs on an exemplary handheld computing device in accordance with an exemplary embodiment of the present invention;

DETAILED DESCRIPTION

The present invention relates to computerized systems and methods for creation and control of interactive user interfaces displayable on computerized computing devices. More specifically, the present invention provides a system and method for creation of interactive user interfaces that are responsive to user engagement with displayed elements on the interface of a computerized device, and yet does not require software code authoring knowledge. Further, the present invention provides a system and method for controlling a user interface displayed on a computerized computing device to prompt user engagement in a manner that is fun, engaging and/or simple to understand, and easily adapted to linear video.

Figure 1:
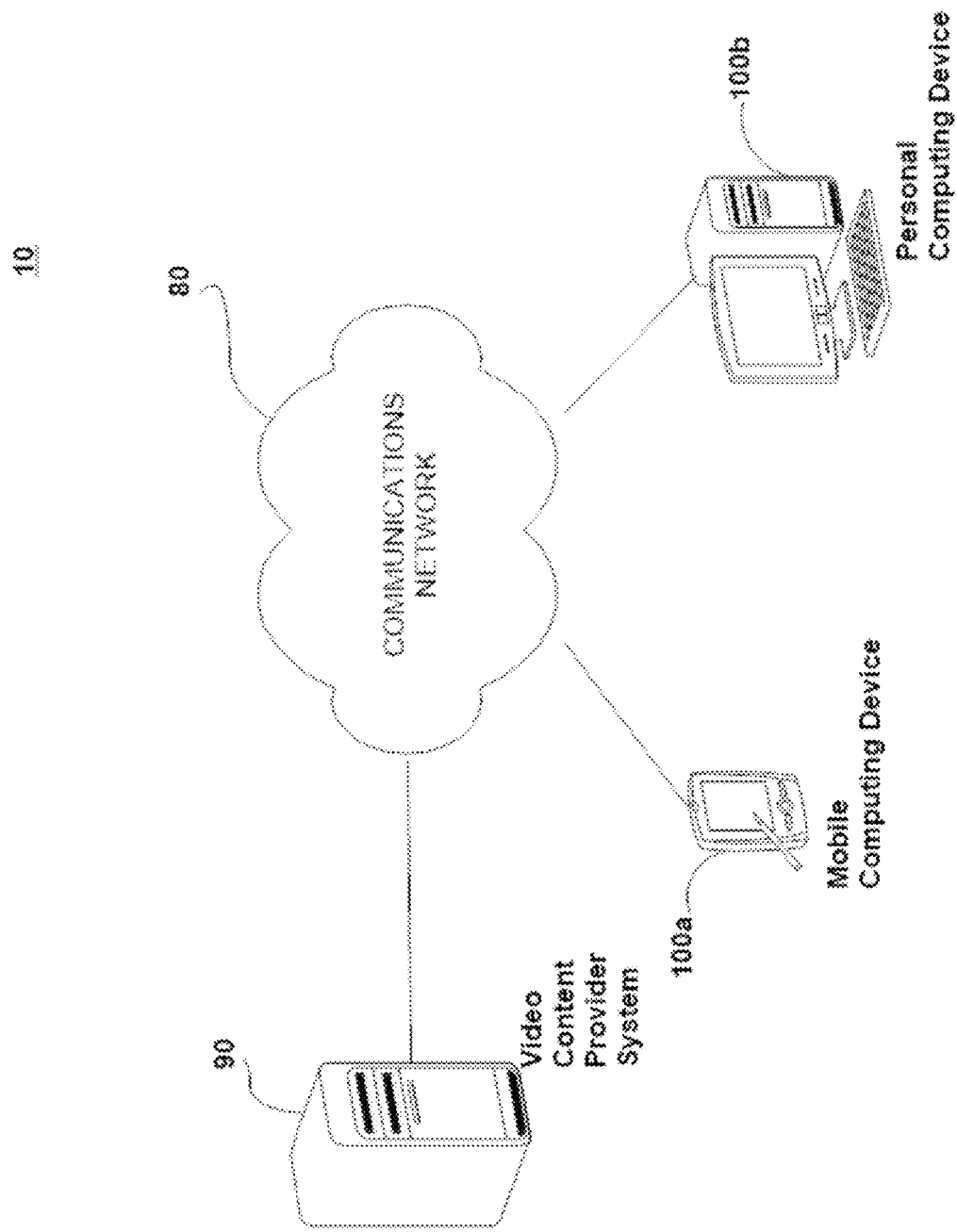
FIG. 1 is a system diagram showing an exemplary network computing environment in which the present invention may be employed.

An exemplary embodiment of the present invention is discussed below for illustrative purposes. FIG. 1 is a system diagram showing an exemplary network computing environment in which the present invention may be employed.

The present invention may be understood with reference to the exemplary simplified network environment 10 of FIG. 1. As shown in FIG. 1, the exemplary network environment 10 includes a conventional video content provider system 90, which may be a web server. As further illustrated by FIG. 1, the exemplary network computing environment 10 further includes computing devices, such as mobile computing device 100a and personal computing device 100b. Any suitable computing devices may be used for the purposes described herein. By way of example, the mobile computing device 100a may be a smartphone, a tablet computer, or the like that includes conventional hardware and software and is able to communicate with the video content provider system 90 and execute software applications for the purposes described herein. Similarly, the personal computing device 100b may be a desktop personal computer (PC), laptop computer, tablet computer or the like that includes conventional hardware and software and is able to communicate with the video content provider data system 90 and execute software applications for the purposes described herein. Alternatively, the computing device 100b may be a game console or game system such as an Xbox, PlayStation, or the like, or an information appliance, such as an as Apple TV, Amazon Fire TV and Google Chromecast, Mi box, television, or the like.

In this exemplary embodiment, the video content provider system 90 is operatively connected to the computing devices 100a, 100b via a communications network 80, such as the Internet and/or a Virtual Private Network (VPN) connection. Hardware and software for enabling communication of data by such devices via such communications networks are well known in the art and beyond the scope of the present invention, and thus are not discussed in detail herein.

For non-limiting illustrative purposes only, the present invention is discussed below primarily in the context of a video game. Accordingly, references are made to authoring of an interactive video game user interface by an author and playing of a video game by a player. It should be noted, however, that this example is non-limiting, and that the present invention is equally applicable in contexts other than the context of video games.

Video Game Authoring Example

Figure 2:
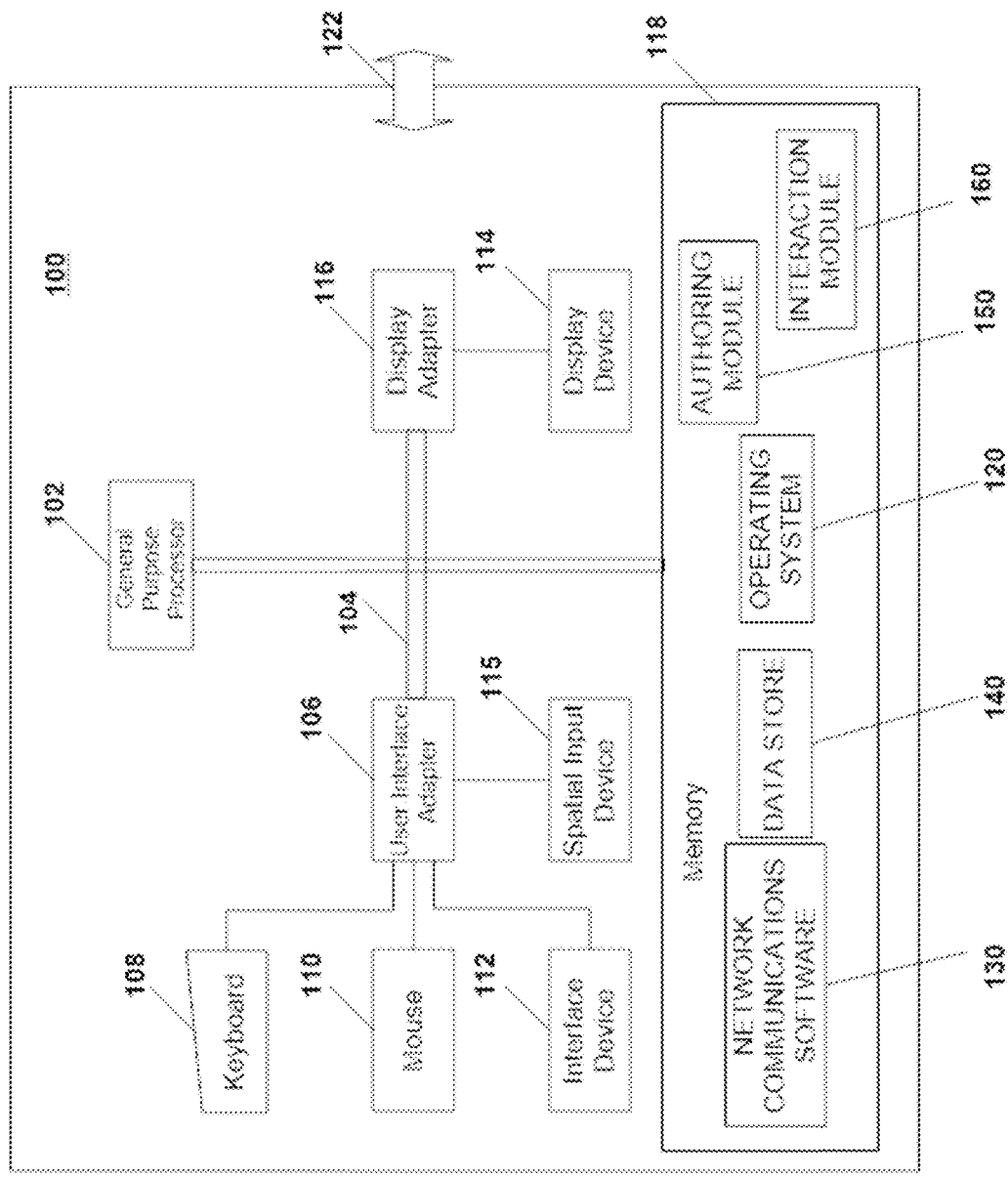
FIG. 2 is a schematic diagram of an exemplary special-purpose computing device in accordance with an exemplary embodiment of the present invention.

FIG. 2 is a block diagram showing an exemplary game-type interface system 100 (either computing device 100a or 100b) in accordance with an exemplary embodiment of the present invention. The game system 100 is a special-purpose computer system that includes conventional computing hardware storing and executing both conventional software enabling operation of a general purpose computing system, such as operating system software 120 and network communications software 130, and specially-configured computer software for configuring the general purpose hardware as a special-purpose computer system including at least one of a gameplay interface authoring module 150 and a gameplay interaction module 160 for carrying out at least one method in accordance with the present invention. By way of example, the communications software 130 may include conventional web browser software, and the operating system software 120 may include iOS, Android, Windows, or Linux software. When configured as an interface authoring system, the system 100 includes the interface authoring module 150 and may include or exclude the interaction module 160. When configured as an interaction system 100, the interaction system 100 includes the interaction (e.g., gameplay) module 160 and may include or exclude the interface authoring module 150.

Accordingly, the exemplary game system 100 of FIG. 2 includes a general-purpose processor, such as a microprocessor (CPU), 102 and a bus 104 employed to connect and enable communication between the processor 102 and the components of the presentation system in accordance with known techniques. The exemplary presentation system 100 includes a user interface adapter 106, which connects the processor 102 via the bus 104 to one or more interface devices, such as a keyboard 108, mouse 110, and/or other interface devices 112, which can be any user interface device, such as a touch sensitive screen, digitized entry pad, etc. The bus 104 also connects a display device 114, such as an LCD screen or monitor, to the processor 102 via a display adapter 116. The bus 104 also connects the processor 102 to memory 118, which can include a hard drive, diskette drive, tape drive, etc.

In this example, the game system 100 includes a spatial input device 115 for sensing movement of the device in space, e.g., movement, acceleration and/or position/orientation inputs to the device. By way of example, the spatial input device 115 may include a camera and/or microelectromechanical systems (MEMS), such as magnetometer, accelerometer and/or gyroscope sensors for sensing movement, acceleration and/or position/orientation inputs, and associated hardware and software of a type presently found in many conventional smartphone and tablet computers for such purposes.

The game system 100 may communicate with other computers or networks of computers, for example via a communications channel, network card or other network interface (e.g., via a Bluetooth of WiFi connection) or modem 122. The game system 100 may be associated with such other computers in a local area network (LAN) or a wide area network (WAN), and may operate as a server in a client/server arrangement with another computer, etc. Such configurations, as well as the appropriate communications hardware and software, are known in the art.

The game system 100 is specially-configured in accordance with the present invention. Accordingly, as shown in FIG. 2, the game system 100 includes computer-readable, processor-executable instructions stored in the memory for carrying out the methods described herein. Further, the memory stores certain data, e.g. in databases or other data stores shown logically in FIGS. 2, 3 and 4 for illustrative purposes, without regard to any particular embodiment in one or more hardware or software components. For example, FIG. 2 shows schematically storage in the memory 118 of a gameplay authoring module 150, e.g., specially-configured software, and a gameplay module 160, e.g., specially-configured software. Optionally, other software and/or data may be stored in a corresponding data store 140 of the memory 118.

Figure 3:
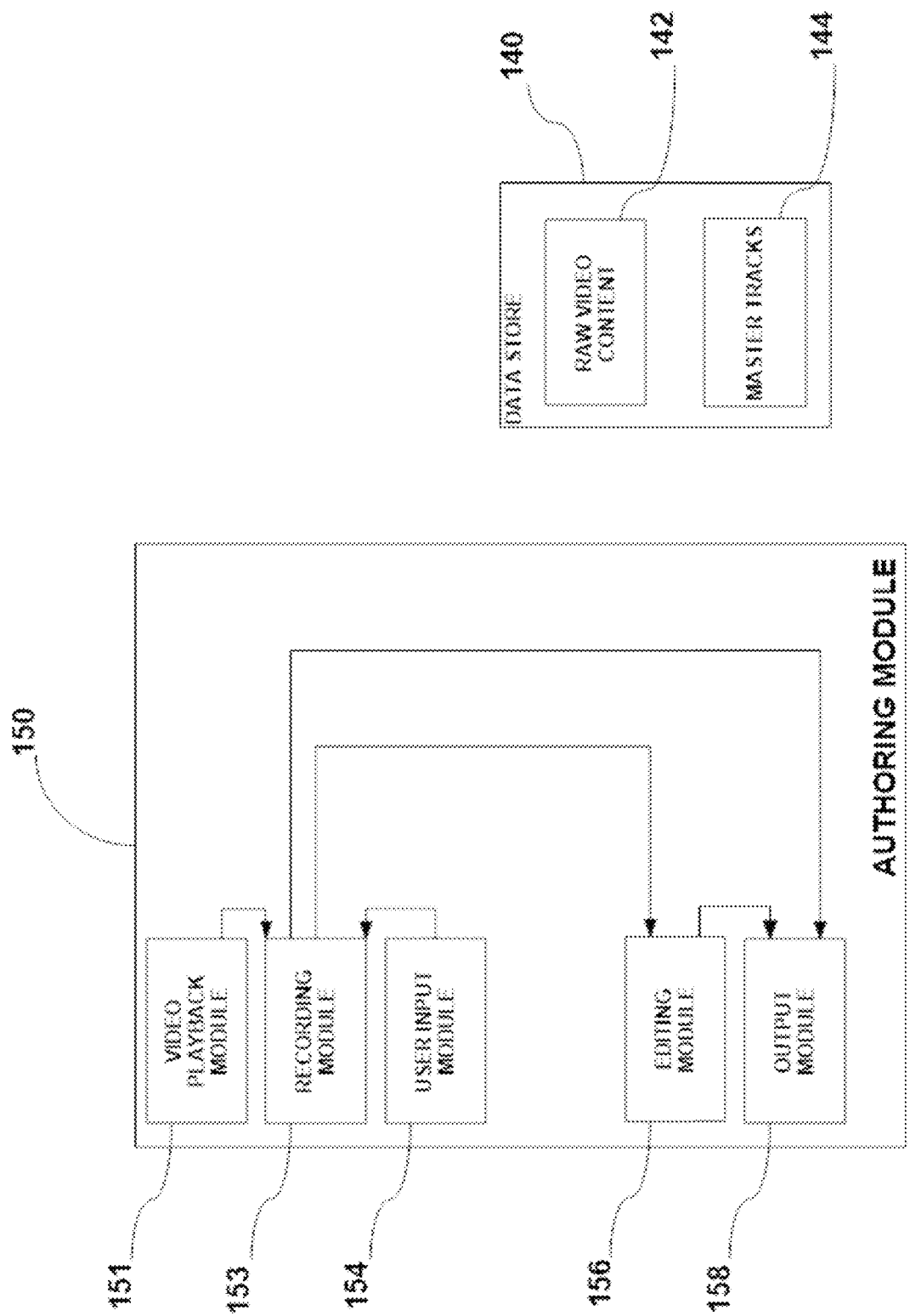
FIG. 3 is a block diagram illustrating relationships among logical components of the authoring module of the exemplary computing device of FIG. 2.

FIG. 3 is a block diagram illustrating selected logical components of the exemplary interface authoring module 150 of FIG. 2. As will be noted from FIG. 3, the exemplary authoring module 150 principally includes a video playback module 151, a recording module 153, an author/user input module 154, and an output module 158. Optionally, and in the example of FIG. 3, the authoring module 150 further includes an editing module 156. These modules may be implemented primarily by specially-configured software including microprocessor-executable instructions stored in the memory 118 of the game system 100.

Further, the authoring module 150 may interface with elements stored in a special-purpose or common data store 140 storing video content 142 (e.g., *.mp4, *.mov, *.avi or other video data formats), such as content that may be user-generated content created by the user at the game system 100 (e.g., smartphone), or content that may be streamed or otherwise received/downloaded via communications network 80, e.g., from video content provider system 90. The authoring module 150 may also create master tracks 144, as described herein, and store them in the data store 140. The terms "store," "stores," "stored" and "storing" herein are used in a broad non-limiting sense and include, for example, storing in long-term data storage, or merely writing to volatile memory/RAM.

Figure 4:
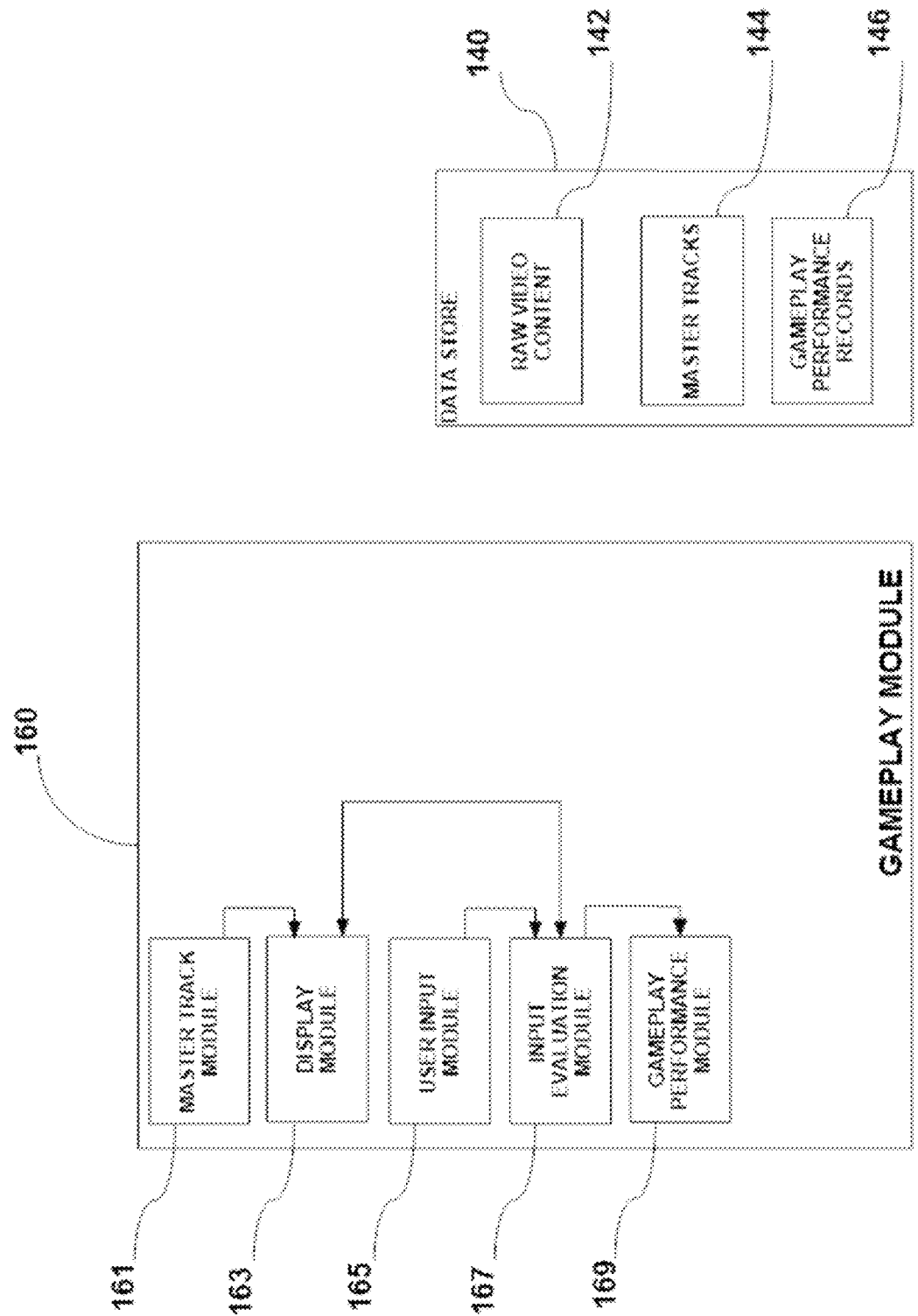
FIG. 4 is a block diagram illustrating relationships among logical components of the gameplay module of the exemplary computing device of FIG. 2.

As referred to above, the game system 100 may be specially-configured to store in the memory 118 a gameplay interaction module 160. FIG. 4 is a block diagram illustrating selected logical components of the exemplary gameplay interaction module 160 of FIG. 2. As will be noted from FIG. 4, the gameplay interaction module 160 principally includes a master track module 161, a display module 163, a user input module 165, an input evaluation module 167, and a gameplay interaction performance module 169. These modules may be implemented primarily by specially-configured software including microprocessor-executable instructions stored in the memory 118 of the game system 100.

Further, the gameplay interaction module 160 may interface with elements stored in a special-purpose or common data store 140 storing video content 142 (e.g., *. mp4, *.mov, *.avi or other video data formats), such as content that may be user-generated content created by the author at the interface authoring system 100 (e.g., smartphone), or content that may be streamed or otherwise received/downloaded via communications network 80, e.g., from video content provider system 90. The gameplay module 160 may also store in the data store 140 master tracks 144 created by the authoring module 150, as described herein. Further, the gameplay module 160 may store in the data store 140 gameplay performance records 146, which are generated by the gameplay interaction performance module.

Figure 5:
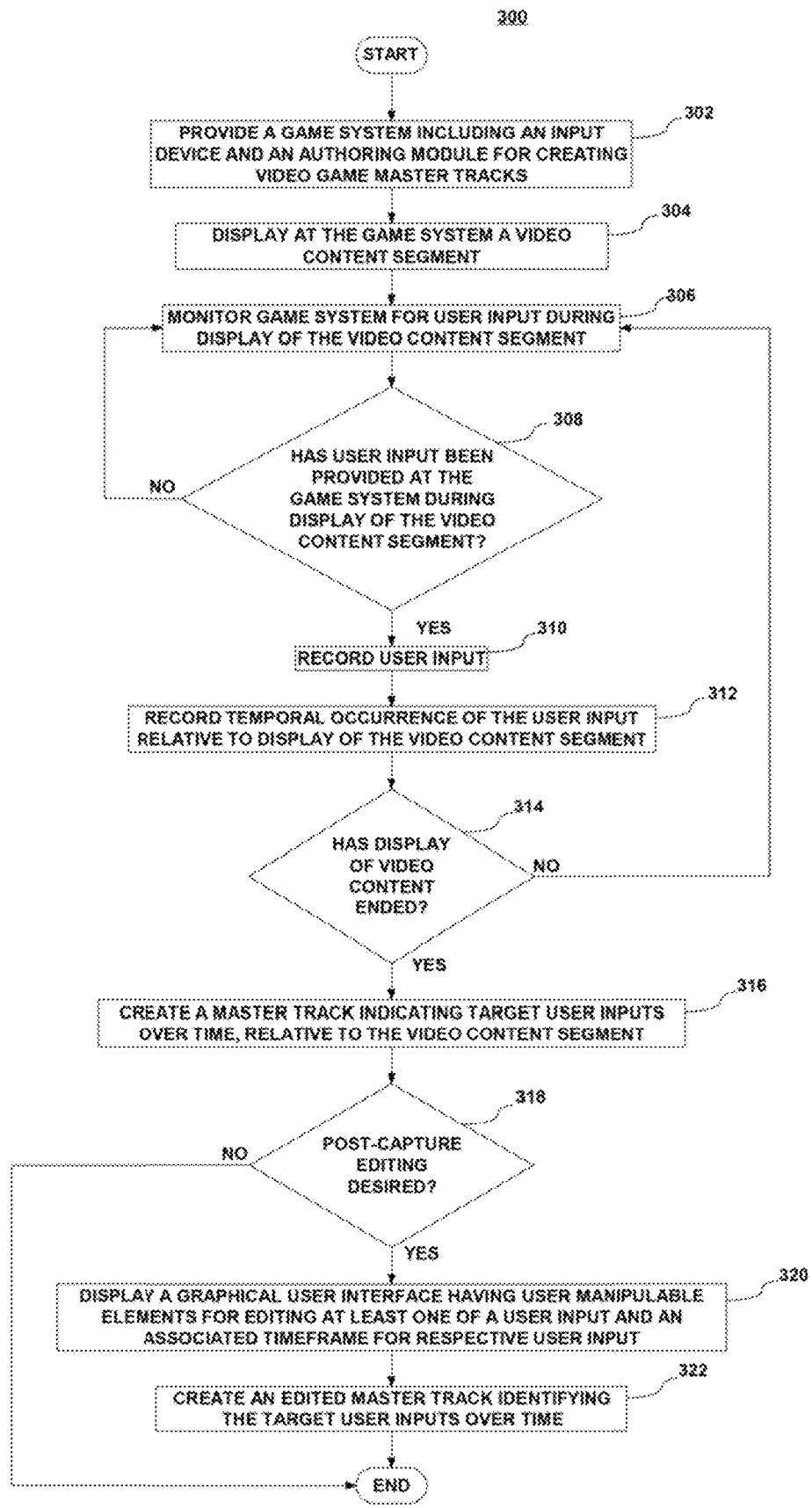
FIG. 5 is a flow diagram illustrating an exemplary method for creation of interactive user interfaces that are responsive to user engagement with displayed elements on the interface of a computerized device in accordance with an exemplary embodiment of the present invention.

FIG. 5 is a flow diagram 300 illustrating an exemplary method for creation of interactive user interfaces that are responsive to user engagement with displayed elements on the interface of a computerized device, in accordance with an exemplary embodiment of the present invention. More specifically, the flow diagram 300 illustrates an exemplary method for providing a computerized device with a graphical user interface for creation of an interactive user interface, without the need for software code writing knowledge.

Referring now to FIGS. 3 and 5, the exemplary method begins with providing of a game interface system 100 (see FIG. 5) including an authoring module in accordance with the present invention, as shown at 300 and 302.

The authoring module 150 receives and captures physical inputs to the system 100 device that represent and directly correspond to target input for a player/user during a gameplay/interaction session. More specifically, it records the input of an author manipulating a physical device 100 (such as a smartphone, a joystick and/or it's directional pad or other buttons, VR headset, etc.) or a sensor-based gesture recognition device (e.g., Microsoft HoloLens, Xbox Kinect, etc.) in synchronization with a video content segment while the author watches playback of the video segment, such that the target input directly corresponds to matching input that will need to be required by the user. The terms "record," "records," and "recording" herein are used in a broad non-limiting sense and include, for example, capturing and storing in long-term data storage, or merely writing to volatile memory/RAM. For example, if the author wants to require the player to tilt/rotate the player's device 30 degrees clockwise at a certain point in the video, the author will tilt/rotate the author's gameplay interface authoring device 30 degrees clockwise at that point in the video. Similarly, if the author wants to require the player to tap a touchscreen device or manipulate a joystick in a certain fashion at a certain point in the video, then the author will tap the touchscreen or manipulate the joystick in the desired fashion at that point in the video. In these examples, the system requires the user/player to provide the same type of input to the system as the user/author provides in order to provide the desired input. In certain embodiments, the system maps the author's physical input to required related user/player physical input, which again is performed without the need for the author to write any software code. For example, in such embodiments, if the author wants to require the user/player to rotate a spatial input enabled device at a certain point in the video, then the author may actuate a joystick/game controller pad button at that point in the video, because the system is configured to map the author's input of the joystick actuation during an interface authoring session to a user's/player's spatial input of an enabled device during a gameplay/interaction session. The author's input occurs in synchronization with video playback to allow a game author to record timestamped target input values that the game will ultimately prompt the player to mimic, either in exact fashion, or in a related fashion (e.g., the interface may require an opposing input, e.g., a tilt to the left when the author tilts to the right, or a corresponding input, such as a tilt to the right of 10-30 degrees when the author tilts to the right 20 degrees). The video playback speed may be adjusted (e.g., half speed) during recording to allow the author greater finesse over the recording. However, recorded target values are always timestamped or otherwise synchronized relative to the point in the video playback at which they were recorded, no matter the playback speed.

By way of example, the authoring module 150 may be provided on the device by downloading a corresponding software "app" from an "app store," via a communications network onto the game system 100, such as a conventional smartphone (such as an Apple iPhone) or tablet (such as an Apple iPad) device including a spatial input device, as is known in the art. The corresponding software app including the authoring module 150 in accordance with the present invention may have been previously developed and published to the app store for subsequent download by users, as is known in the art.

In a preferred embodiment, as in this example, the game system further includes a spatial input device 115 (such as an accelerometer, gyroscope, magnetometer and/or camera for sensing movement, acceleration and/or orientation).

As shown at 304, the game system 100 may then be used to display a video content segment via display device 114 of the game system. This may be performed using a graphical user interface of the app, or by using conventional operating system or other software of a type well-known in the art for such conventional smartphone and tablet devices. In either case, the video playback is performed or monitored (for time synchronization purposes) by the video playback module 151 of the authoring module 150, as shown in FIG. 3. The video content segment may be any conventional video content segment. By way of example, the video content segment may be user-generated content recorded by the user using the user's game system (e.g., smartphone) device, or it may be a video content segment that has been downloaded from a video content provider system 90 via a communications network 80, as shown in FIG. 1, to the game system 100/100a/100b, using conventional hardware and software technologies known in the art. By way of example, the video content segment may be in the form of a *.mp4, *.mov, *.avi or other video data file, or may be in the form of a video data stream. In particular, the video content segment might be a first person point of view (POV) video, such as those captured by a GoPro style camera carried by an athlete engaged in a sporting activity (such as downhill mountain biking or car racing), but a game can be created from any type of linear video. For example, games may be created in which a player mimics driving a car, skiing down the slope of a mountain, dancing in a music video, or performing a bicycle jump depicted in the linear video. By way of example, raw video content segments 142 (in their native/original format, without a need for customization for the purposes herein) may be stored in the data store 140 of the game system 100.

Referring again to FIGS. 3 and 5, the exemplary method next involves monitoring the game system 100 for user input during display of the video content segment, and determining whether the user has provided user input at the game system 100 during display of the video content segment, as shown at 306 and 308. The monitoring and determining is performed by the user input module 154 of the authoring module 150 at the game system 100 device, in cooperation with conventional hardware and software of the game system device. Specifically, the authoring module 150 monitors the input devices for occurrences of user input, such as a touch or gesture input via a touchscreen interface device 112, a spatial orientation input, such a roll, pitch or yaw input or a spatial movement or acceleration input, provided by physically manipulating the game system 100 in three-dimensional space, which is sensed by the spatial input device 115, a joystick or other button actuation input via a button-type interface device 112, a joystick manipulation input provided via a joystick input device 112, or gesture or other input that could be recognized by a VR headset, etc., or a sensor-based gesture recognition input device 112 (e.g., Microsoft HoloLens, Xbox Kinect, etc.), etc. Each of these occurrences results in generation of data representing the input at the game authoring device.

If author input has not been provided, the system simply continues to monitor for author input. When it is determined at 308 that author input has been provided, the game system, under control of the authoring module 150 and input module 154, records the author input, as shown at 310. For example, the module may identify a touchscreen input, a spatial orientation input, a spatial acceleration input, or a button actuation input. The recording module 153 of the authoring module 150 records the occurrence of the author input, and further records the temporal occurrence of the author input as shown at 312. The temporal occurrence indicates the time of occurrence of the user input relative to a timeline of the playback of the video content segment, and is indicated to the recording module by the video playback module 151 for time synchronization of the occurrence of author inputs to the video playback. For example, the temporal occurrence may indicate that the author input occurred at 12.5 seconds after the beginning of playback of the video content segment. Accordingly, this links the input to a point in time within the during of the playback of the video content.

In one embodiment, the recording module 153 stores target acceleration, roll, pitch, and yaw data values which are timestamped in synch to the video. Each timestamp may reference a start and end point in the video (time, portion thereof or frame based) as opposed to real time. This allows for the video playback speed to be changed and the target input data to remain synced to the video. The format also allows for the storage of additional timestamped target input values (example: button press, user audio input, etc.) as desired to expand the game play requirements. Timestamps may contain one, multiple or no target input values and can also overlap with other timestamps.

Next, it is determined if display of the video content has ended, as shown at 314. If not, the method flow returns to 306 and the game system 100 and authoring module 150 continue to monitor for a next user input.

In this example, after display of the video content segment has ended, the authoring module 150 then creates a master track, as shown at 316. In this example, the creation of the master track 144 is performed by the output module 158 of the authoring module 150, based on input received from the recording module 153, as shown in FIG. 3. The master track 144 is essentially a data file that includes a compilation of the recorded author inputs (as tracked by the author input module 154), and corresponding temporal occurrence (as tracked by the video playback module 151) of each author input that was recorded by the authoring module during playback of the video content segment. These time-sensitive author input actions identify the associated target actions that a user/player will want to perform during a subsequent gameplay interaction session, while viewing the same video content segment. The data file may have any suitable format, and may be stored separately from the raw video content, e.g. as master tracks 144 stored in the data store 140 of the game system 100, as shown in FIG. 3. The master track may be stored for local use during gameplay sessions, or may be published for use by others—e.g., by transmitting the master track via a communications network to a server where it may be stored and subsequently retrieved by others for use during gameplay sessions. In certain embodiments, the master track may include information identifying the raw video content segment to which it relates. In other embodiments, the video content segment data file may be modified to including information that can be used to associate it with a master track. In certain embodiments, the master track information and video content segment may be merged or otherwise be associated. Any suitable approach may be used in accordance with the present invention.

Each master track 144 thus includes target user input information that can be used to prompt a user to provide input during a game play session. This data may include the user input information, data such as values indicating button actuation, touchscreen input, joystick manipulation roll, pitch, yaw, movement and acceleration inputs, time of occurrence data, etc. This information is used during a gameplay session to ensure that the appropriate prompt will be displayed at the appropriate time during video content playback to prompt the user to provide corresponding input to match the target input.

Figure 7:
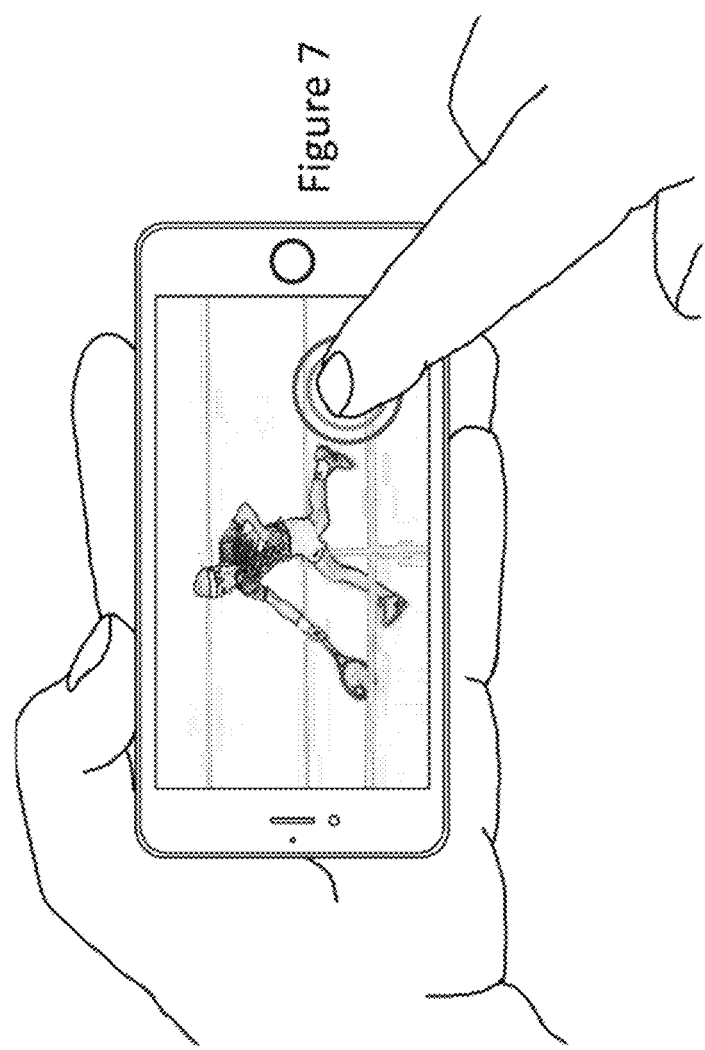
FIG. 7 illustrates display of an exemplary interactive user interface window that is responsive to a touch user input that is prompted by a circular touchscreen input graphic displayed within the user interface window in accordance with an exemplary embodiment of the present invention.

For example, when a touchscreen input is provided by an author during a gameplay interaction authoring session, and the author input module 154 detects the touchscreen input and data is stored that will be used to prompt a player/user to provide corresponding touchscreen input during a gameplay/interaction session, which may involve touching a corresponding touchscreen input graphic (such as a circle, or cross) displayed on the display screen during video playback during a gameplay session, overlaid over the displayed video, to indicate that the user needs to provide corresponding touchscreen input. Any suitable prompt may be provided to prompt the user to provide the desired input. FIG. 7 illustrates display of an exemplary interactive user interface window on an exemplary smartphone device 100 that is responsive to a touch user inputs that is prompted by a circular touchscreen input graphic displayed within the user interface window.

By way of further example, when a spatial acceleration input is provided by an author during a gameplay authoring session, that spatial acceleration input is sensed by sensors of the game authoring device, and data is created that can be used by the gameplay device to display a suitable prompt for prompting input of corresponding spatial acceleration input at the gameplay device. Any suitable prompt may be provided to prompt the user/player to provide the desired input.

By way of further example, when a roll, pitch and/or yaw input is provided by an author during a gameplay authoring session, that spatial orientation input is sensed by sensors of the game authoring device, and data is created that can be used by the gameplay device to display a suitable prompt for prompting input of corresponding spatial orientation input at the gameplay device (e.g., by tilting or otherwise manipulating the game system device to change its spatial orientation or "attitude" in space) by the user/player.

As discussed in greater detail below, in one embodiment, the prompt is provided as a modified view that involves a two-dimensional or three-dimensional transform of a video display window, such that the video content is shown misaligned (in two- or three-dimensional space) with a video display region of a hardware or software video display environment. For example, the video content segment may be shown in a two-dimensional graphical user interface window that is shown misaligned with a physical two-dimensional video display area of the game system device, as is discussed further below in relation to a gameplay session. By way of example the transform may involve displaying a modified view of the video content segment due to a two-dimensional translation or rotation of the displayed video content segment relative to a viewing region. This may result in a modified view of the video content segment that is misaligned in that only a portion of the video content segment is visible due to the translation or rotation. By way of further example, the transform may involve displaying a modified view of the video content segment due to a three-dimensional translation or rotation of the displayed video content segment relative to a viewing region. This may result in a modified view of the video content segment that is misaligned in that the whole or a portion of the video content segment is shown in a perspective view such that it appears to be displayed on a plane or surface that is misaligned in three-dimensional space with a plane or surface of a physical display device of a virtual display environment.

Figure 8A:
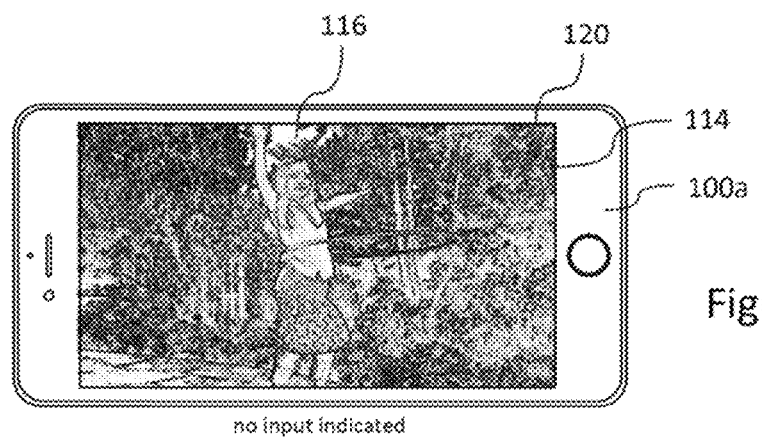
FIGS. 8A-9C illustrate display of an exemplary interactive user interface responsive to spatial movement user prompts and inputs on an exemplary handheld computing device in accordance with an exemplary embodiment of the present invention.
Figure 8B:
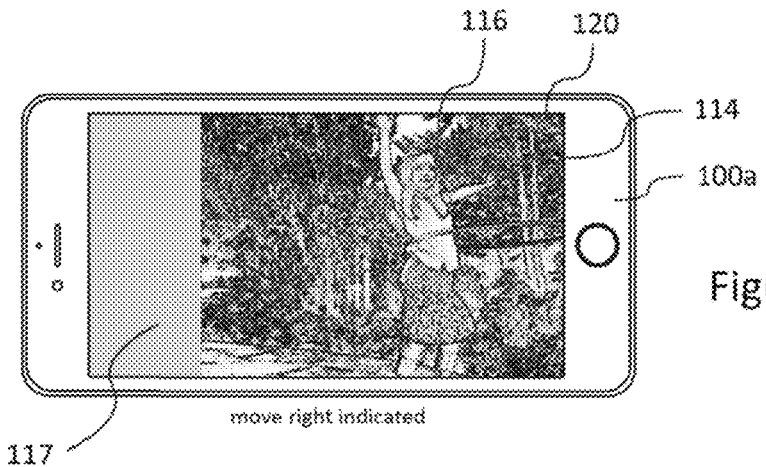
Figure 9A:
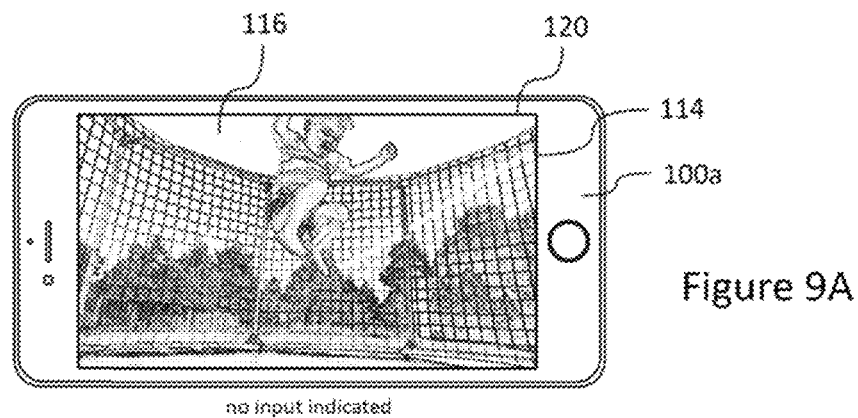
Figure 9B:
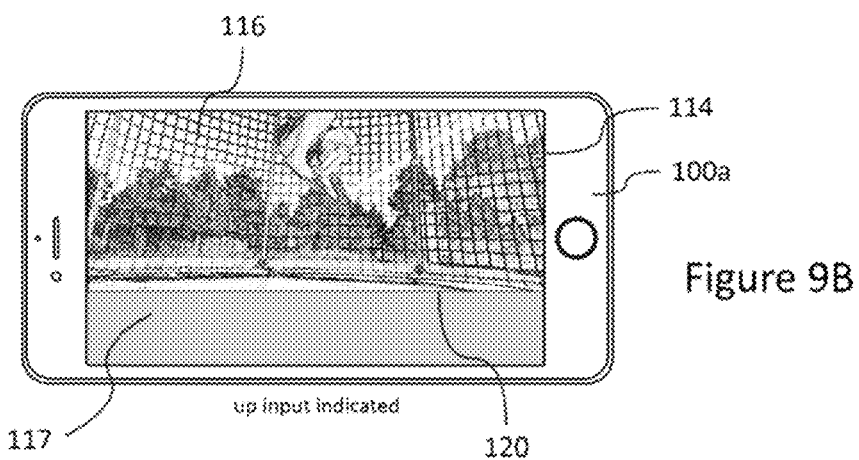
Figure 10A:
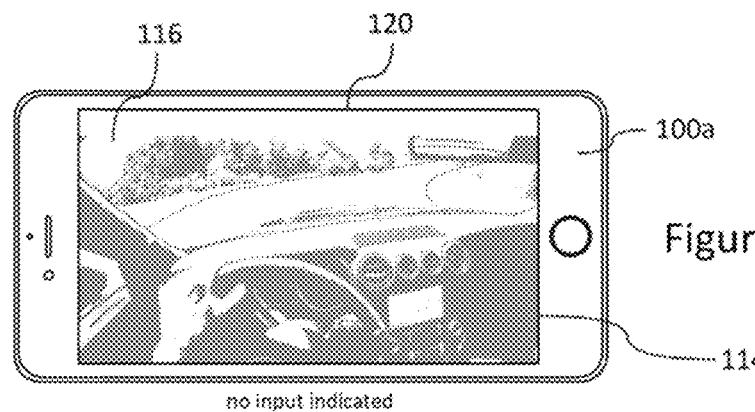
FIGS. 10A-10C illustrate display of an exemplary interactive user interface responsive to roll axis user prompts and inputs on an exemplary handheld computing device in accordance with an exemplary embodiment of the present invention.
Figure 10B:
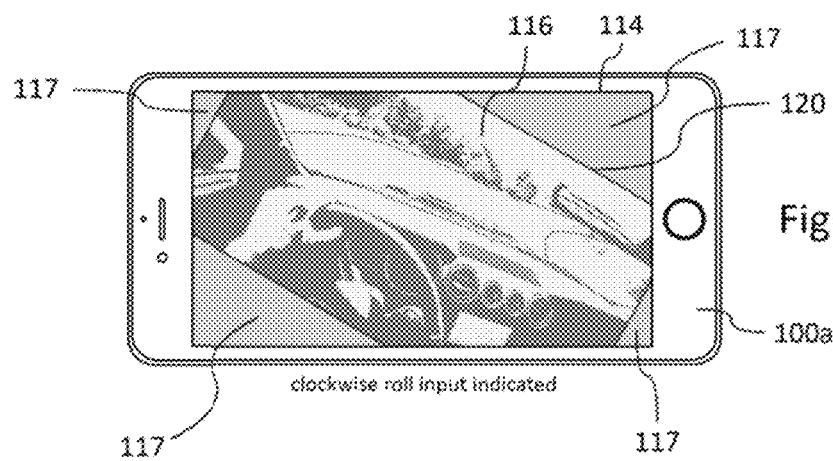
Figure 12B:
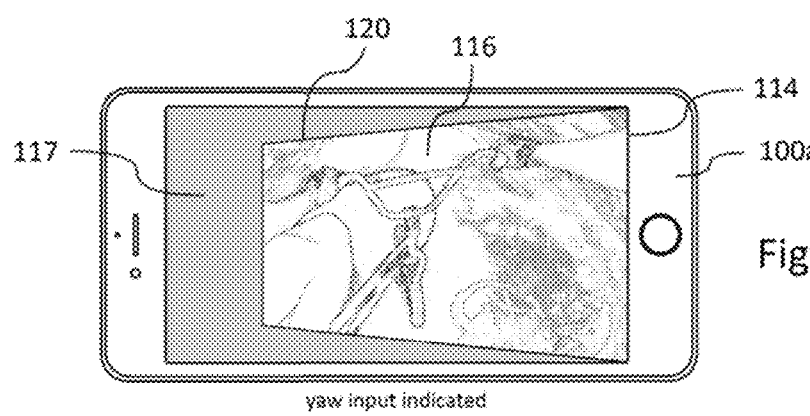
Figure 13A:
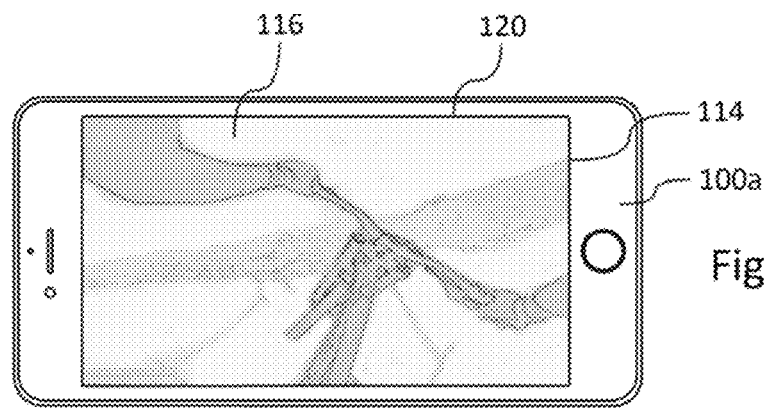
FIGS. 13A-13C illustrate display of an exemplary interactive user interface responsive to multiple-axis user prompts and inputs on an exemplary handheld computing device in accordance with an exemplary embodiment of the present invention.
Figure 13B:
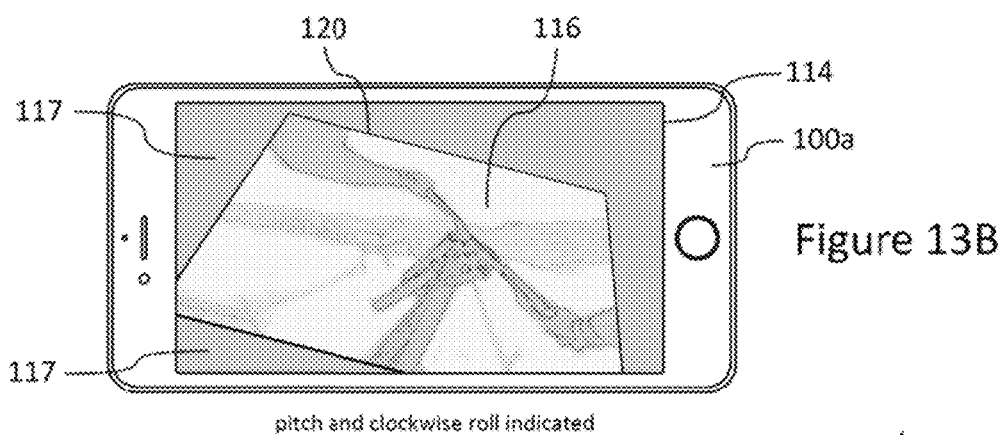

By way of example, FIGS. 8B, 9B and 10B show two-dimensionally modified views of a video content segment displayed in user interface windows that are misaligned with a physical video display area of the game system device to prompt the user to provide spatial input to re-align the physical video display area with the display video content segment, as discussed in further detail below. FIGS. 11B, 12B and 13B show three-dimensionally modified views of a video content segment that are misaligned with a physical video display area of the game system device to prompt the user to provide spatial orientation input to re-align the physical video display area with the display video content segment, as discussed in further detail below. The misalignment of the display may reflect a difference, between an actual position or orientation of the device and a target position or orientation of the device, that is continuously updated using feedback from the game system device as the device's position or orientation changes over time, in view of changes in the target position or orientation over time.

As will be appreciated by those skilled in the art, manipulation of the authoring system device 100 during an authoring session creates inputs that are sensed by the authoring system device, such as spatial orientation and/or spatial acceleration inputs to the game system device 100 that are sensed by the spatial input device 115. As well-known in the art, this creates data in the form of values representing the orientation, acceleration and/or other inputs. These values may be recorded in association with a time of input relative to the playback of the video content, and then these values may be compared to then-current values during a gameplay session to determine whether the user in providing spatial orientation input that matches, or sufficiently nearly matches, the nature, degree and timing of target input such that the user is deemed to be playing the game successfully, as discussed in greater detail below.

Accordingly, the present invention provides a system and method for creation of interactive user interfaces that are responsive to user engagement with displayed elements on the interface of a computerized device, and yet does not require software code authoring expertise. This is accomplished by permitting a user to create the interactive user interface by simply manipulating a physical input device— e.g., a smartphone—such that the user's inputs to the device are recorded in synchronization to a video content segment, to define the target inputs for a player to match during a gameplay session by providing the same or sufficiently similar, as determined by specified parameters, inputs in synchronization to playback of the same video content segment.

Although the master track 144 so captured and created is complete and may be used by the author or by others during gameplay/interface sessions, in this exemplary embodiment the method continues with the authoring component's optional determination of whether post-capture editing is desired, as shown at 318. If not, the method ends and the master track may be used as is. However, if it is determined that post-capture editing is desired (e.g., via user input provided to the authoring module 150 via an input device of the game system), then the method involves display of a graphical user interface having user manipulable graphical elements for editing at least one of an input and an associated timeframe for the respective user input, as shown at 320.

Figure 15:
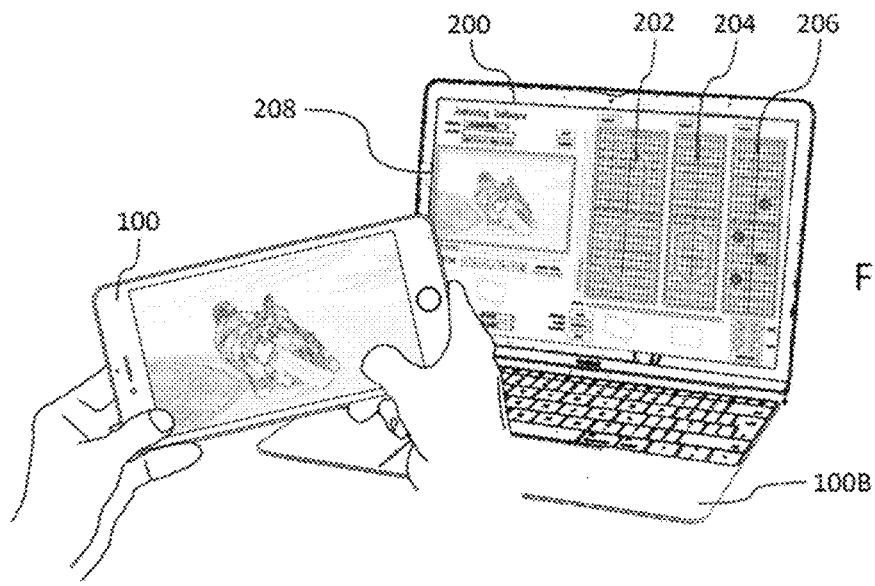
FIG. 15 illustrates an exemplary computerized system including an authoring and editing module of FIG. 3.
Figure 16:
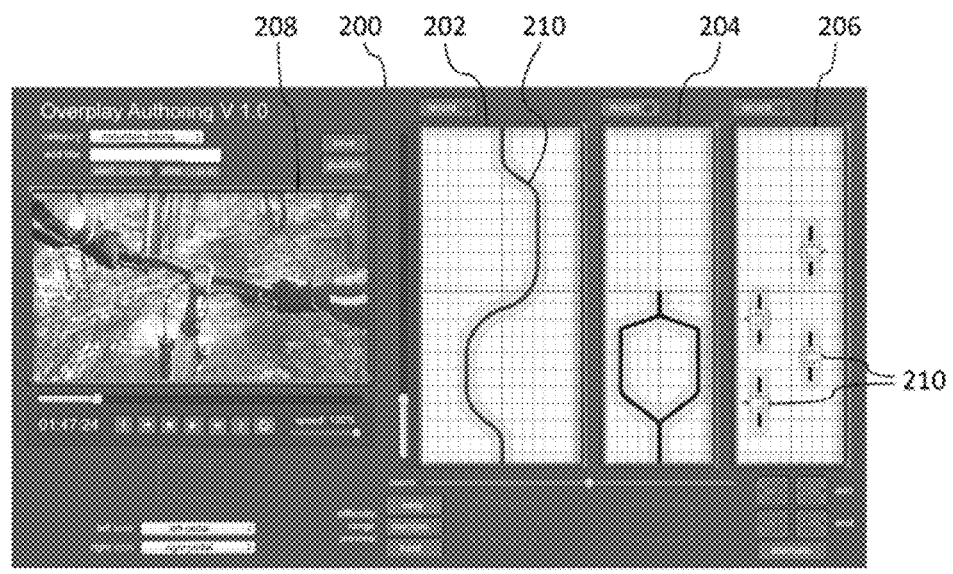
FIG. 16 illustrates an exemplary graphical user interface window of the computerized system of FIG. 11.

FIG. 15 illustrates an exemplary computerized game system 100b including an authoring module 150 and editing module 156 of FIG. 3. In other embodiments, the authoring module 150 and editing module 156 may reside on separate computing devices. In other embodiments, the authoring module 150 and editing module 156 may reside on each of multiple computing devices, e.g., a smartphone and a PC, and may work in tandem to provide the authoring and/or editing experience. For example, the authoring module may be implemented via an app downloaded to a smartphone, and the editing module may be implemented via a web-based interface or downloaded software resident and a desktop computer functioning as an editing system, which may communicate with and work in tandem with the smartphone for editing purposes. Referring again to FIG. 15, in this example, the editing module 156 receives the output from the recording module 153 as shown in FIG. 3, and displays a graphical user interface window editing 200 including exemplary roll, pitch, and touch graphical elements 202, 204, 206 that are user-manipulable to adjust the target user inputs that will be incorporated into and edited/final master track 144. For example, as shown in FIGS. 15 and 16, the graphical user interface 200 may display the video content segment in a video window 208, and display a curve 210 showing recorded roll inputs in association with points in time during the video, as shown at 202. For example, the user may click and drag points of the curve to adjust the target input. By way of further example, the graphical user interface 200 may display a set of slider-type graphical elements 206, each of which may be clicked and dragged to points in time relative to the video, and that may include user-manipulable starting and ending points, that may be adjusted to specify timeframes during which user input provided will be deemed to be sufficiently matching input, for touchscreen inputs. Alternatively, the graphical user interface window 200 may permit the author to add target inputs that were not originally recorded while manipulating the input device. For example, dragging the start of a target input value to an earlier sync point in the video, increasing the amplitude of a target value or a of range target input values, may be performed. Optionally, the editing graphical user interface window 200 may display captured target inputs in real time, as the user manipulates a corresponding game system 100 to provide inputs, as shown in FIG. 15. After editing, the editing module 156 communicates with the output module 158 to output an edited master track 144 identifying the target user inputs, prompts, etc., as shown at 322 in FIG. 5, and the method ends.

Video Game Play Example

Figure 6:
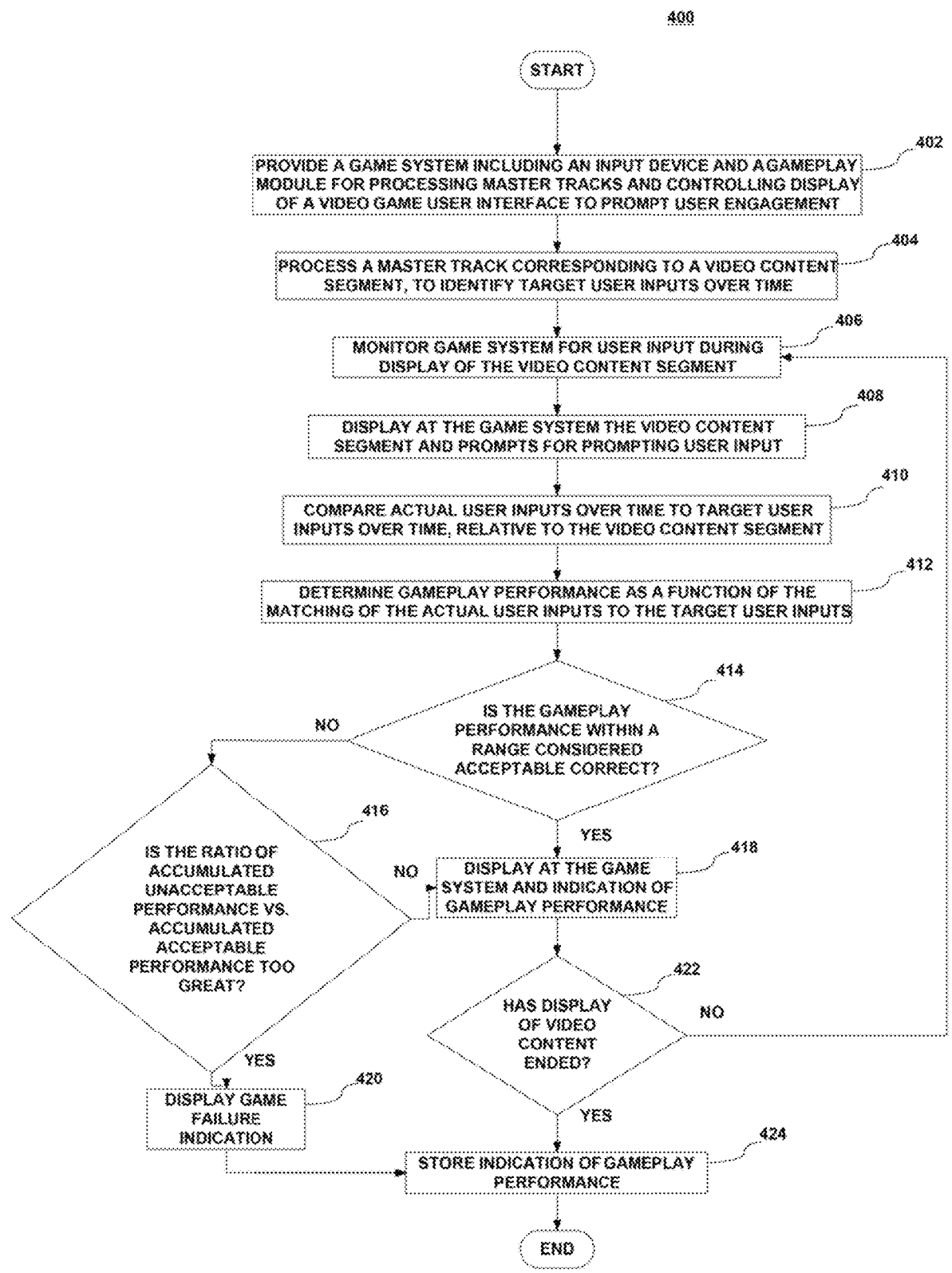
FIG. 6 is a flow diagram illustrating an exemplary method for controlling an interactive user interfaces to prompt user engagement in accordance with an exemplary embodiment of the present invention.

FIG. 6 is a flow diagram 400 illustrating an exemplary method for controlling interactive user interfaces to prompt user engagement in accordance with an exemplary embodiment of the present invention. Referring now to FIGS. 4 and 6, the exemplary method begins with providing of a game system 100 (see FIG. 6) including an input device (such as a spatial input device, which may include a magnetometer, accelerometer, gyroscope and/or camera for sensing movement, acceleration and/or roll/pitch/yaw orientation of the device in three-dimensional space) and a gameplay/interface module 160 in accordance with the present invention, as shown at 400 and 402.

The gameplay interface module 160 includes a display module 163, which may playback and display a video content segment 152 retrieved from a data store 140 of the game system 100, or elsewhere. Notably, the game system stores in its data store 140 (or receives, e.g., via a communications network) a master track 144 that corresponds to the video content segment 152 to be displayed during a gameplay session. The corresponding master track includes data representing the target inputs that the user should provide during playback of the associated video content segment to play successfully. Accordingly, as shown in FIG. 4, the exemplary method includes the master track module 161 processing a master track 144 corresponding to a video content segment to identify target user inputs during playback. Further, the method includes the user input module 165 monitoring the game system 100 for user input during display of the video content segment, and the display module 163 displaying at the game system 100 the video content segment, as shown at 404, 406 and 408. As discussed above, the user input may be a touch or gesture input via a touchscreen interface device 112, a spatial orientation input, such a roll, pitch or yaw input, or a spatial movement or acceleration input, provided by physically manipulating the game system 100 in three-dimensional space, which is sensed by the spatial input device 115, a joystick or other button actuation input via a button-type interface device 112, a joystick manipulation input provided via a joystick input device 112, or gesture or other input that could be recognized by a VR headset, etc., or a sensor-based gesture recognition input device 112 (e.g., Microsoft HoloLens, Xbox Kinect, etc.), etc. Each of these occurrences results in generation of data representing the input at the gameplay device.

Notably, the display module 161 displays the video along with prompting information, in synchronization with the video. This involves the display module 163 interpreting target user input information from the master track 144, receiving user input via user input module 165 and comparing it to the target input via input evaluation module 167 as shown at 410, and providing associated player prompts at the game system. The player prompts may include audio or other prompts. As discussed above, in one embodiment, the target user input information is used to cause display at the game system 100 of player prompts in the form of a modified view of the video content segment.

In one embodiment, the modified view involves a two-dimensional or three-dimensional transform of the video content segment, such that the graphical user interface video display surface (e.g., a two-dimensional window or three-dimensional surface) is shown misaligned (in two- or three-dimensional space) with a physical video display area of the game system device, or with a video display region of a video display environment (e.g. a three-dimensional region in a virtual world as viewed through a VR display), as discussed above. In one embodiment, with respect to spatial orientation inputs, the display module 163 causes two-dimensional transforms or three-dimensional transforms to a graphical user interface display surface/window for display of the video content segment playback such that a video display surface is shown misaligned with a video display area of the game system device, to indicate to the user what input is needed, at a given time during playback. To be successful in playing the game, the player corrects the misalignment discrepancy by adjusting the player's input to bring the video display window and physical video display area back into alignment in three-dimensional space. The greater or lesser difference between these two surfaces (e.g., planes, in the context of a two-dimensional video display window and a two-dimensional video display screen) indicates how well a user is interacting with the interactive user interface.

Accordingly, the present invention provides a system and method for controlling a user interface display the modified view of the video to prompt user engagement in a manner that is fun and engaging, and such that gameplay is simple to understand.

Figure 8C:
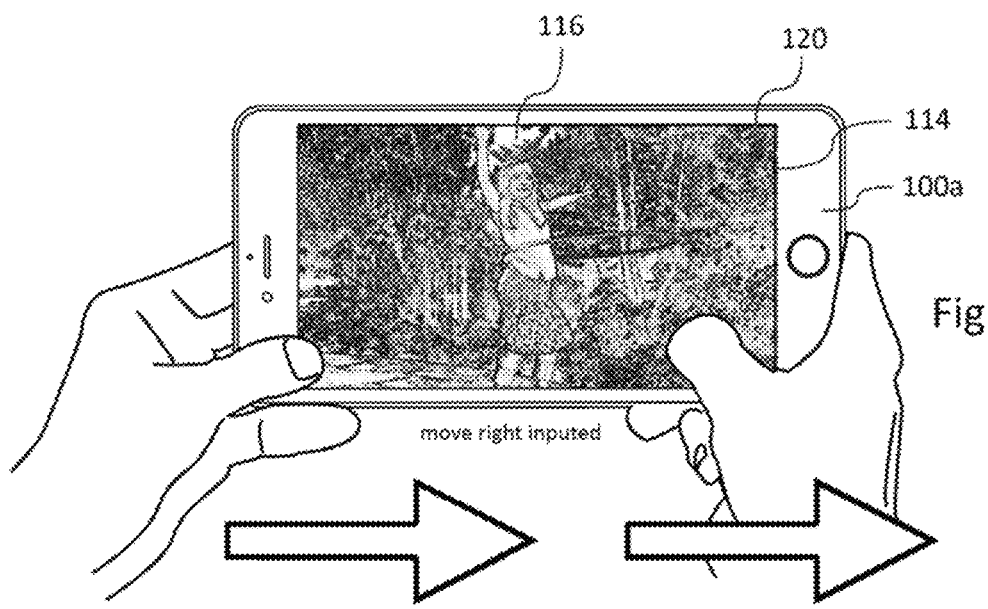

By way of example with respect to acceleration-type spatial movement inputs, FIGS. 8A-8C illustrate display of exemplary interactive user interfaces providing user prompts and responsive to user inputs. More specifically, FIG. 8A shows an exemplary smartphone-type game system 100a having a physical display screen device 114 that in FIG. 8A is showing video content 116 displayed in a graphical user interface display window 120 that is aligned with the display screen 114, as is typical of video displays on such devices. This display is characteristic of what the video display module 161 would display when the master track 144 indicates no target user input (or target user input involving no tilt). FIG. 8B shows the game system 100a having a physical display screen device 114 that in FIG. 8B is showing video content 116 displayed in a graphical user interface display window 120 that is misaligned with the display screen 114, and showing a misalignment cue 117 in the form of a border to the displayed video content segment. The resulting display on the display screen 114 is a modified display of the video content that includes prompting to the user to provide user input. In particular, the graphical user interface display is controlled to provide a modified display that is the result of target user input information in the master track 144 that is the result of the author's physical manipulation of the input device during gameplay authoring. More specifically, at this point in time in the video, the author of the game moved the gameplay authoring device to the right. This corresponds to horizontal acceleration in a rightward direction. Accordingly, at this corresponding point in time in the video, the gameplay module, based on target input information provided in the master track, causes the modified display on the device 100 that includes the graphical user interface video display window 120 shifted to the right relative to the display screen 114 of the gameplay device. This prompts the player/user to provide input to the gameplay device 100 to attempt to align the display screen 114 of the display device with the graphical user interface display window 120, namely, by moving/accelerating the game system device 100a to the right, as shown in FIG. 8C. This causes a re-alignment of the display screen 114 with the display window 120, and is considered to be a successful gameplay action, because the player/user input matches the target input (namely, the target input provided by the author and recorded by the authoring module while authoring the gameplay master track).

Figure 9C:
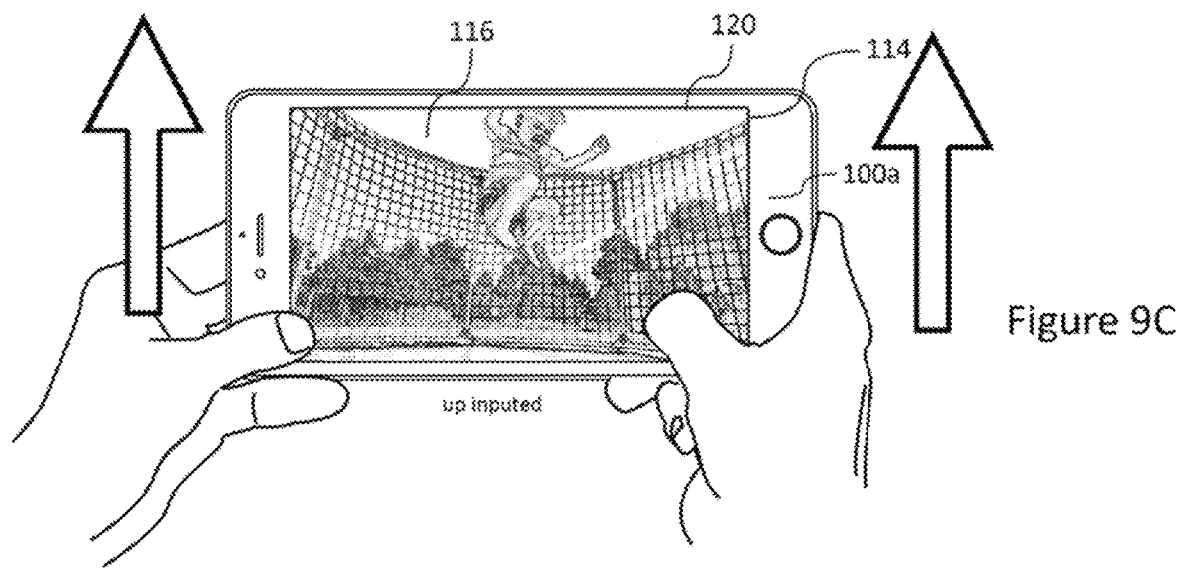

FIGS. 9A-9C show similar displays, but with respect to a prompt for acceleration input in an upward direction.

Figure 10C:
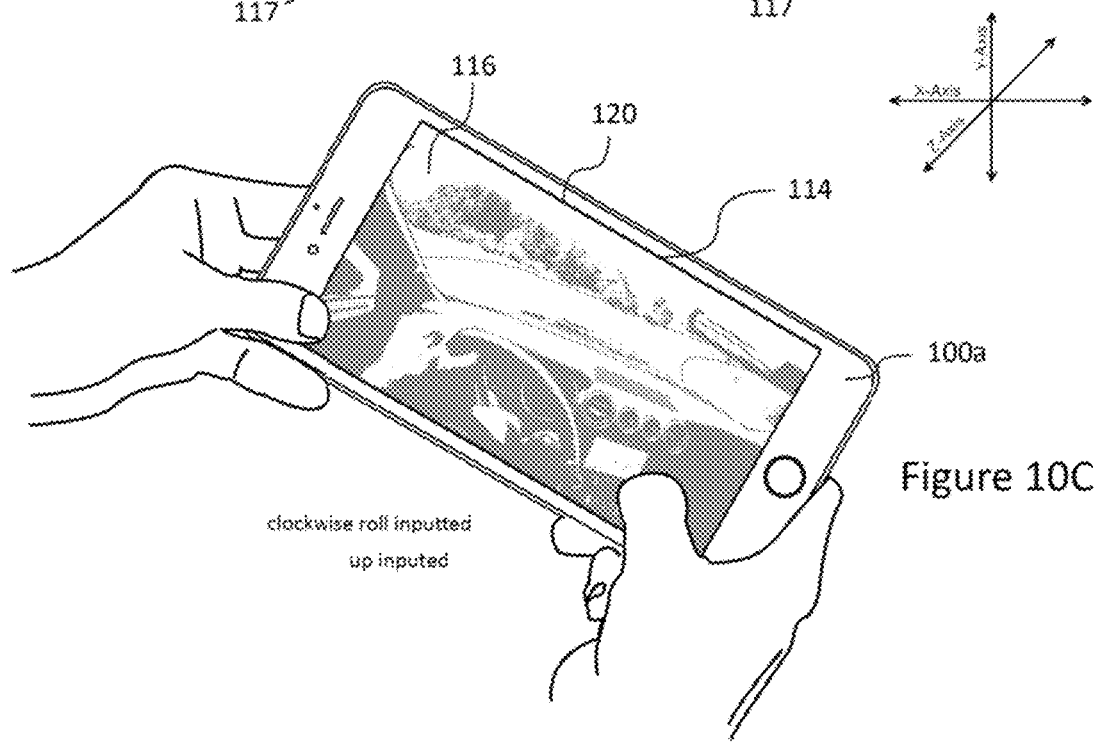

FIG. 10A shows a game system 100a having a physical display screen device 114 that in FIG. 10A is showing video content 116 displayed in a graphical user interface display window 120 that is aligned with the display screen 114. Accordingly, the display in FIG. 10A is not prompting the user to provide any particular input to the game system 100a device. FIG. 10B shows a game system 100a having a physical display screen device 114 that in FIG. 10B is showing video content 116 displayed in a graphical user interface display window 120 that is misaligned with the display screen 114, and showing a misalignment cue 117 in the form of a border to the displayed video content segment. Accordingly, the display in FIG. 10B is prompting the user to provide particular input to the game system 100a device. In particular, the graphical user interface display is controlled to provide a modified perspective view in which the display window 120 appears to be rotated (roll input of 30 degrees of clockwise roll about the Z-axis shown in FIG. 10B). The resulting display on the display screen 114 is a modified display of the video content that includes prompting to the user to provide user input to attempt to align the display screen 114 of the display device with the graphical user interface display window. This provides the player/user with a visual prompt to provide corrective input to the game system 100a, e.g., by rotating the game system 100a device 30 degrees clockwise around the Z-axis to counteract the displayed roll. In particular, the modified display is the result of prompting information in the master track 144 that is the result of the author's physical manipulation of the input device during gameplay authoring. More specifically, at this point in time in the video, the author of the game rotated the gameplay authoring device 30 degrees around the Z-axis in the clockwise direction. When the player/user rotates the game system 100*a* device to provide 30 degrees of clockwise roll, this causes a re-alignment of the display screen 114 with the display window 120, as shown in FIG. 10C, which is considered to be a successful gameplay action, because the user input matches the target input (namely, the target input provided by the author and recorded by the authoring module while authoring the gameplay master track). It should be noted that in this example, the clockwise roll input corresponds to a right turn displayed in the video content. This correspondence between the displayed video content and the required gameplay input can contribute to an engaging gameplay experience.

FIG. 11A shows a game system 100*a* having a physical display screen device 114 that in FIG. 11A is showing video content 116 displayed in a graphical user interface display window 120 that is aligned with the display screen 114. Accordingly, the display in FIG. 11A is not prompting the user to provide any particular input to the game system 100*a* device. FIG. 11B shows a game system 100*a* having a physical display screen device 114 that in FIG. 11B is showing video content 116 displayed in a graphical user interface display window 120 that is misaligned with the display screen 114, and showing a misalignment cue 117 in the form of a border to the displayed video content segment. Accordingly, the display in FIG. 11B is prompting the user to provide particular input to the game system 100*a* device. In particular, the graphical user interface display is controlled to provide a modified perspective view in which the display window 120 appears to be tipped rearwardly (pitch input of 30 degrees of rearward pitch about the X-axis shown in FIG. 11B). The resulting display on the display screen 114 is a modified display of the video content that includes prompting to the user to provide user input to attempt to align the display screen 114 of the display device with the graphical user interface display window. This provides the player/user with a visual prompt to provide corrective input to the game system 100*a*, e.g., by tilting the game system 100*a* device 30 degrees in a forward direction to counteract the displayed rearward pitch. In particular, the modified display is the result of prompting information in the master track 144 that is the result of the author's physical manipulation of the input device during gameplay authoring. More specifically, at this point in time in the video, the author of the game tilted the gameplay authoring device 30 degrees in a forward pitch direction. When the player/user tilts the game system 100*a* device to provide 30 degrees of forward pitch, this causes a re-alignment of the display screen 114 with the display window 120, as shown in FIG. 11C, which is considered to be a successful gameplay action, because the user input matches the target input (namely, the target input provided by the author and recorded by the authoring module while authoring the gameplay master track). It should be noted that in this example, the forward pitch input corresponds to a forward pitch "wheelie" displayed in the video content. This correspondence between the displayed video content and the required gameplay input can contribute to an engaging gameplay experience.

Figure 12A:
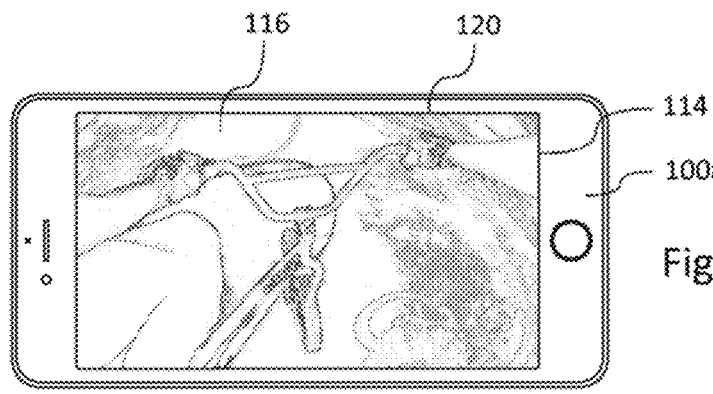
FIGS. 12A-12C illustrate display of an exemplary interactive user interface responsive to yaw axis user prompts and inputs on an exemplary handheld computing device in accordance with an exemplary embodiment of the present invention.
Figure 12C:
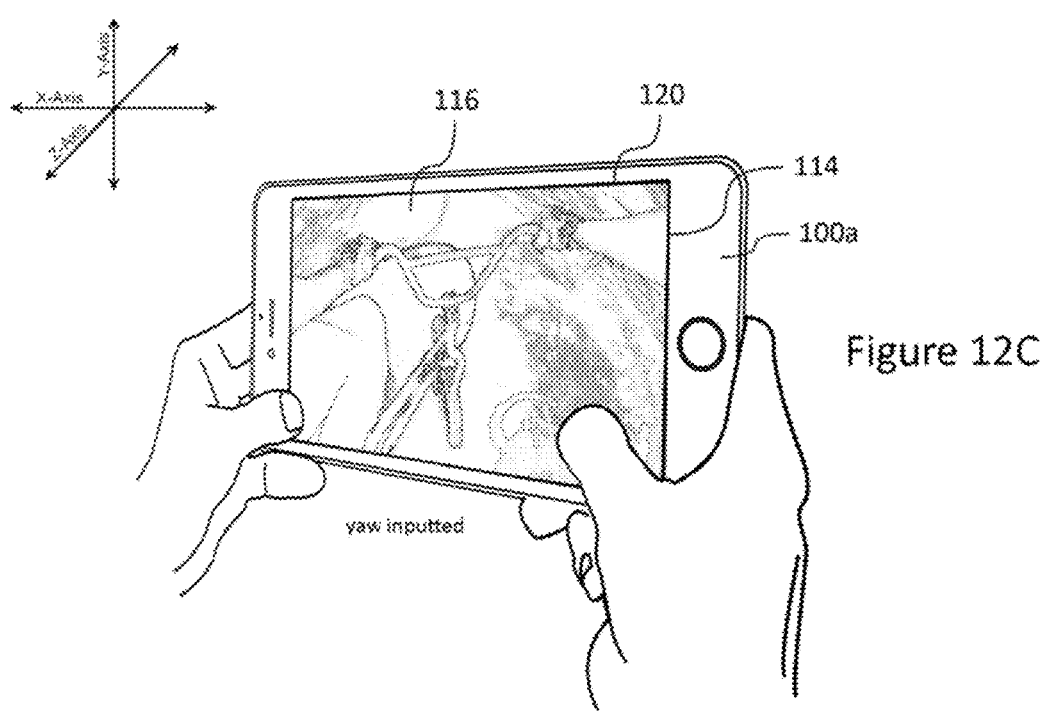

By way of further example, FIG. 12A shows a game system 100*a* having a physical display screen device 114 that in FIG. 12A is showing video content 116 displayed in a graphical user interface display window 120 that is aligned with the display screen 114. Accordingly, the display in FIG. 12A is not prompting the user to provide any particular input to the game system 100*a* device. FIG. 12B shows a game system 100*a* having a physical display screen device 114 that in FIG. 12B is showing video content 116 displayed in a graphical user interface display window 120 that is misaligned with the display screen 114, and showing a misalignment cue 117 in the form of a border to the displayed video content segment. Accordingly, the display in FIG. 12B is prompting the user to provide particular input to the game system 100*a* device. In particular, the graphical user interface display is controlled to provide a modified perspective view in which the display window 120 appears to be turned sideways (yaw input of 30 degrees of leftward turn about the y-axis shown in FIG. 12B). The resulting display on the display screen 114 is a modified display of the video content that includes prompting to the user to provide user input to attempt to align the display screen 114 of the display device with the graphical user interface display window. This provides the user with a visual prompt to provide corrective input to the game system 100*a*, e.g., by turning the game system 100*a* device 30 degrees in a leftward direction to correspond to the displayed leftward turn of the display window 120. In particular, the modified display is the result of prompting information in the master track 144 that is the result of the author's physical manipulation of the input device during gameplay authoring. More specifically, at this point in time in the video, the author of the game turned the gameplay authoring device 30 degrees in a leftward direction. When the player/user turns the game system 100*a* device to provide 30 degrees of leftward turn this causes a re-alignment of the display screen 114 with the display window 120, as shown in FIG. 12C, which is considered to be a successful gameplay action, because the user input matches the target input (namely, the target input provided by the author and recorded by the authoring module while authoring the gameplay master track). It should be noted that in this example, the leftward turn input corresponds to a leftward flick of the bicycle and rider displayed in the video content. This correspondence between the displayed video content and the required gameplay input can contribute to an engaging gameplay experience.

Figure 13C:
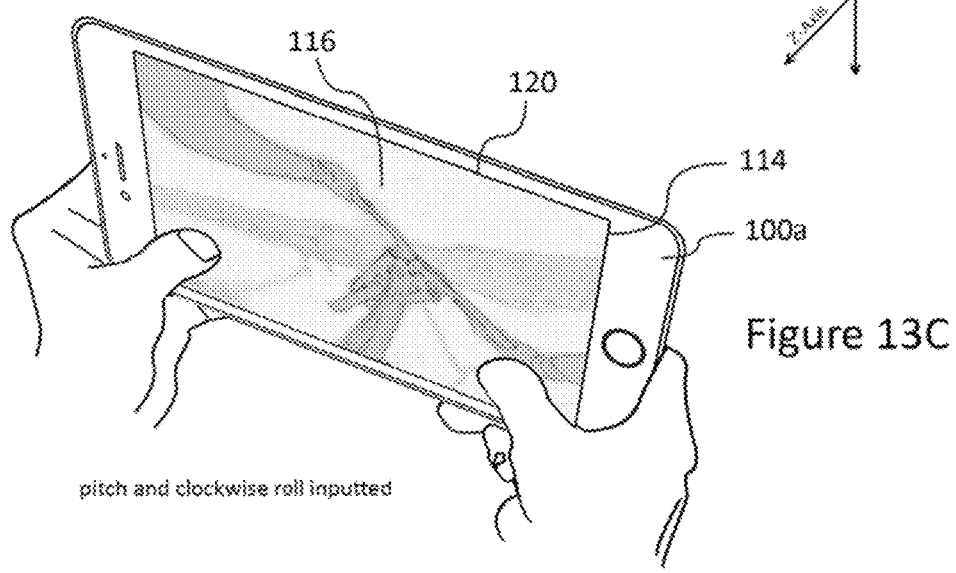

One or more of the roll, pitch and yaw (or other) prompts may be combined to prompt a user to provide roll, pitch and yaw (or other) inputs on multiple axes simultaneously. FIGS. 13A-13C illustrate an example in which the display is controlled to provide a modified view prompting the user to provide both pitch and clockwise roll in combination.

It should be noted that in these examples, the requested horizontal, vertical, roll and yaw input follows in the same direction as the modified display (an aligned approach), but that for the pitch example, the prompt does not visually follow the same direction as the required user input (an opposing approach). Either an aligned approach, or an opposing approach, may be used, as desired.

Referring again to FIGS. 4 and 6, the method involves the input evaluation module 167 of the gameplay module 160 comparing the actual user inputs over time (during a gameplay session) to target user inputs over time (as specified in the master track), relative to the video content segment, as shown at 410 and discussed above. As discussed above, the input evaluation module 167 in part provides feedback to the display module so that the appropriate prompt can be displayed at all times. For example, if the target user input is 30 degrees of clockwise roll input at a point in time, and the user is providing 25 degrees of clockwise roll input at that time, the display module will cause a prompt to be displayed prompting the user to provide 5 additional degrees of clockwise roll input.

Additionally, the input evaluation module 167 determines gameplay performance as a function of the matching of the actual user inputs to the target user inputs, as shown at 412. By way of example, this may include a determination of a match in time, in input type, and in degree. The input evaluation module 167 determines whether gameplay performance is within a range considered acceptably correct, and therefore matching, as shown at 414. The gameplay performance module 167 may be provided with predetermined parameters for determining whether the user input "matches" the target user input, which may involve allowing for a close match, rather than requiring an exact match, such that a sufficiently close match is determined to be successful game play interaction. For example, a clockwise roll input of 25 degrees may be deemed to match a target input of 30 degrees of clockwise roll. Similarly, a tap of a touchscreen at 12 seconds of elapsed video time may be deemed to match a target input of a tap at 11 seconds of elapsed video time.

If the input evaluation module 167 determines that the user input provided sufficiently matches the target user inputs, then the gameplay performance module 169 of the gameplay module determines gameplay performance as a function of the matching of the actual user inputs to the target user inputs, as shown at 414, and, in this example, causes display at the game system 100*a* of an indication of gameplay performance as shown at 418, which may be performed by the display module 161. For example, the input evaluation module 167 may determine gameplay performance by comparing the amplitude or direction of the stored target input to the amplitude or direction of the user's input, or by comparing the timing of the stored target input to the timing of the user's input, or the input type of the stored target input to the input type of the user's input, or a combination thereof. Successful gameplay actions may lead to the video continuing to play, game points acquisition, audio prompts, health meter increase, difficult level augmentation, countdown timer resets, and/or any other positive game feedback.

The gameplay module 160 then determines whether display of the video content has ended, as shown at 422. If not, then method flow returns to 406 and the game system continues to monitor for user input during display of the video content segment. If it is determined at 422 that display of the video content has ended, then an indication of gameplay performance may be stored, e.g., in a gameplay performance record 146 of the data store 140 of the game system 100, and the method ends, as shown at 424.

If it is determined at 414 that the user has not provided user input that matches the target user inputs, then the game and/or video may be terminated prematurely. For example, the input evaluation module 167 may determine whether a ratio of accumulated unacceptable performance to accumulated acceptable performance exceeds a threshold. If not, flow continues to 418 and an indication of gameplay performance is displayed. If so, however, then a game failure indication may be displayed at the game system 100*a*, and the gameplay performance may be stored, as shown at 420 and 424, and the method ends. Such premature termination may result in a loss of health points, a decreased score or any other negative feedback as appropriate within the context of the game.

In one embodiment, the gameplay performance module 169 has an interrupting animation component that consists of a separate segment of video that is combined with an animation sequence displayed via the display device 114 and/or display window 120. When the input evaluation module and/or the gameplay performance module has determined that the user's input values have differed from the stored target values sufficiently to lead to premature game termination, the interrupting animation may be displayed. For example, a main video segment of a downhill skier might switch to a video of a crash occurring in snow. However, any two linear video segments can be combined in the interrupting animation sequence. In this case an alternate path through the linear video does occur, but it is a unique improvement upon previous versions of linear video segment switching in that the visual break from one linear video segment to the next is made unapparent to the user by combining the video playback with simultaneous transforms to the video display window 120. The switch from the first video segment to the next preferably occurs when the video display window 120 is greatly misaligned with the display area 114 of the display screen, thereby obscuring the transition from one video segment to another.

Figure 14:
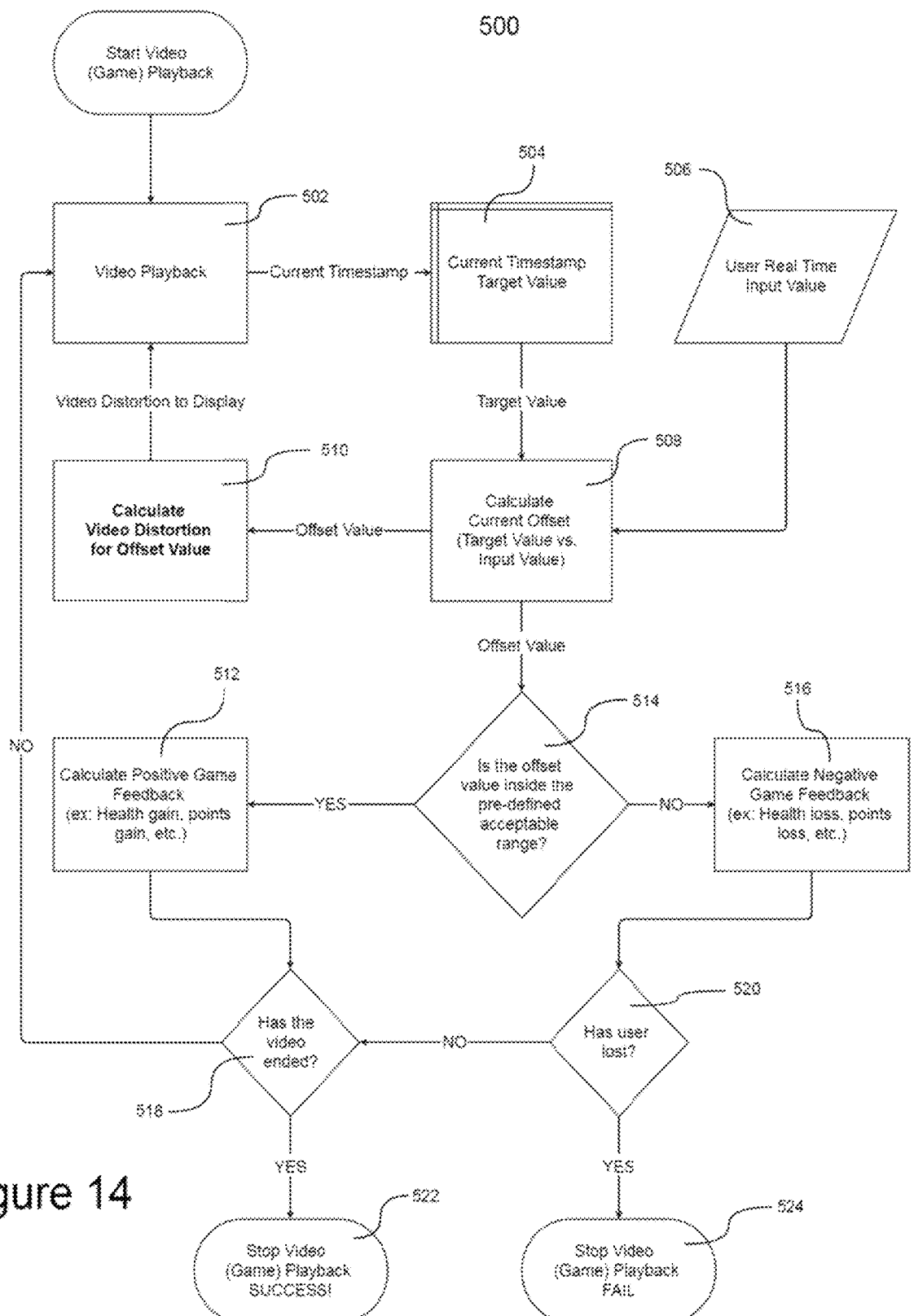
FIG. 14 is a flow diagram illustrating an exemplary method for controlling an interactive user interfaces to prompt user engagement in accordance with an exemplary embodiment of the present invention.

FIG. 14 is a flow diagram 500 illustrating an exemplary method for controlling an interactive user interface to prompt user engagement during a gameplay session, in accordance with an exemplary embodiment of the present invention. As shown in FIG. 14, the method begins with video content playback at the game system 100*a*, as shown at 502. The playback continually establishes a current timestamp representing a point in time relative to a starting point of the video content. From the master track, an input target value for the current timestamp is determined, as shown at 504. As the user provides real-time inputs to the game system 100, corresponding actual input values are created, as shown at 506. The real-time input value is compared for the input target value for a current timestamp, and an offset value (difference) between the values is calculated, as shown at 508. The offset value is used to calculate a corresponding video distortion that is used to provide a modified display of the video content as misaligned with a display area/surface of the display screen/display environment of the game system 100, as shown at 510, and video playback continues as shown at 502. The offset value from 508 is also evaluated to determine whether the value is within a predefined acceptable range, to determine if it sufficiently matches the target input, as shown at 514. If so, positive game feedback is calculated and gameplay and video play continues as shown at 512 unless the video has ended, at which point playback stops as shown at 518 and 522. If the offset value is determined not to be inside the predefined range at 514, then negative game feedback is calculated at 516 and game play and video playback continue unless the user is determined to have lost the game at 520, in which case playback stops as shown at 524.

It should be appreciated that although the exemplary embodiment discussed above involved a smartphone or tablet computing device with a spatial input sensor, that other embodiments make use of other devices that include such sensors, such as a VR headset, and that other embodiments make use of other devices that do not include such spatial input sensors. For example, the game system 100 may comprise a handheld game system, game console, a conventional personal computer, etc. Any device may be used that allows for display of video content, simultaneous receipt of inputs via input devices of the game system, and an authoring module capable of recording the inputs in synchronization to the displayed video, and creating corresponding a master track as generally described herein may be used. Further, it will be appreciated that the present invention may be implemented with any suitable computing device and operating system, including iOS phones and tablets, Android phones and tablets, XBox and Playstation gaming consoles, Nintendo handheld gaming systems, Apple and Windows computers, virtual reality headsets etc.

Three-Dimensional Displays

It should be further appreciated that although the exemplary embodiment discussed above principally involved a game system device with a two-dimensional display screen and two-dimensional video display windows (as shown in the Figures), the invention is not so limited. As mentioned above, the present invention may be used in the context of three-dimensional virtual reality worlds, or with display screens larger than the user's field of view. Accordingly, the video content may be displayed misaligned with a two-dimensional or three-dimensional video display surface of a physical display device or within a virtual display environment. Further the video content may not rely on the misaligned window method at all, but instead rely on other visual distortions as detailed below.

Alternative Prompting

Prompting may be provided in various forms, as appropriate. For example, the graphical user interface may be controlled to display a modified display including a stretching and/or discoloration that is applied to the displayed image in a fashion as to indicate a target value of roll, pitch or yaw. These distortions may be combined with other indicators of target input (e.g., arrows, chevrons, etc.) In the case of roll, for a clockwise target for example, the viewed video could be distorted so that no distortion is applied in the center of an image, and progressively more distortion is applied with increasing proximity towards an outer edge of the image. In this case, the distortion smears/bends the video display in a clockwise direction to provide an appropriate user input prompt. Distorting in a reverse direction is used for to indicate a counterclockwise user input. For a pitch prompt, the video may be displayed in a modified view that is progressively more horizontally stretched working from the center to the bottom and more horizontally compressed working from the center to the top. For a yaw prompt, the video may be displayed in a modified view that is stretched and compressed vertically. As described in the example above, these distortions may be combined to indicate simultaneous target inputs on multiple axes.

Telemetry-Based Authoring

As an alternative to the authoring method described above, a video recording device or associated device that records the actual movements in space of the recording device or other item (e.g., a skier or other athlete, a race car or other vehicle, etc.) during the time of original video recording may be used. This may be a purpose-built device such as a camera (e.g., Garmin VIRB), or software running on a general-purpose device such as a phone or tablet, or a sensor added to or integrated into a camera recording the video to be used. In this case, the video-synched recorded telemetry data is imported into the authoring module and used in place of, or in addition to, the user's physical device manipulation inputs during video segment playback, and the original data may then be edited using the editing module, if desired. Accordingly, the recorded telemetry data itself provides input target state information for use to display to a player a modified display prompting the user to provide input to a game play system during a game play session—in place of the explicit user-provided input to the game authoring system described above. In such embodiments, the game authoring system may exclude the video playback module and the display.

In such telemetry-based authoring embodiments, a computer-implemented method for creation of interactive user interfaces that are responsive to user engagement with a computerized interaction system, the method comprising the following implemented by a computerized interface authoring system comprising at least one processor, an input device operatively coupled to the processor. The memory being operatively coupled to the processor and storing instructions executable by the processor for: processing video content segment data recorded with an input device, the data comprising telemetry data associated with the video content segment and representing inputs received in time-synchronization with the recorded video content segment; for each input received, recording occurrence of the input in association with a time of occurrence of the input in relation to an elapsed time of recording of the video content segment; for each input received, identifying input target state information for use to display to a user a prompt to provide input to an interaction system during an interaction session that corresponds to the respective input received; and storing a master track associated with the video content segment, the master track identifying as target input for an interaction session each input, a respective time of occurrence in relation to an elapsed time of recording of the video content segment, and input target state information for causing display at the interaction system, during the interaction session, of a respective user prompt prompting the user to provide corresponding input to the interaction system.

In such context, an interface authoring system may comprise: a processor; an input device operatively coupled to the processor; and a memory operatively coupled to the processor, the memory storing executable instructions that, when executed by the processor, causes the interface authoring system to perform a method for creation of interactive user interfaces that are responsive to user engagement with a computerized interaction system. The method may comprise: processing video content segment data recorded with an input device, the data comprising telemetry data associated with the video content segment and representing inputs received in time-synchronization with the recorded video content segment; for each input received, recording occurrence of the input in association with a time of occurrence of the input in relation to an elapsed time of recording of the video content segment; for each input received, identifying input target state information for use to display to a user a prompt to provide input to an interaction system during an interaction session that corresponds to the respective input received; and storing a master track associated with the video content segment, the master track identifying as target input for an interaction session each input, a respective time of occurrence in relation to an elapsed time of recording of the video content segment, and input target state information for causing display at the interaction system, during the interaction session, of a respective user prompt prompting the user to provide corresponding input to the interaction system.

In certain embodiments, the video recording device may capture the video content segment but a separate device may capture the telemetry data. In other embodiments, a single device, e.g., a camera, may capture the video content and the telemetry data. In either embodiment, the device for creating the master track may be the same as or different from the devices for capturing the video content segment or the telemetry data. Accordingly, processing data and creating the master track may be performed at a device physically separate from a device for telemetry data capturing or video capturing.

Live Streaming Embodiments

Further, the video content segment may be live streamed video data, and the master track identifying target input for the game play session may comprise the live telemetry data, which may be contained in the same or a separate data stream from the streamed video data. This may allow, for example, streamed live video content to include or be matched with associated telemetry data such that a player can play along with live streamed or televised events, such as automotive or motorcycle racing events, trying to provide inputs deemed to match the telemetry data. In such embodiments, the telemetry data may be processed, e.g., by the display module 163 of the gameplay module, as input target state information that the player needs to try to match during a game play session. This processing may involve interpreting and/or mapping actual telemetry data to provide prompts that do not directly correspond to the telemetry data. For example, telemetry data representing a 60 degree turn of the wheel may be mapped to a target user input of a 30 degree tilt of the game play device. Similarly, telemetry data may be smoothed, such that multiple recorded telemetry data points representing a 40-80 degree turn of the wheel may be mapped to a target user input of a 60 degree tilt of the game play device.

OTHER EMBODIMENTS

As referred to above, the present invention is described above, for illustrative purposes only, with reference to an exemplary embodiment for authoring video game user interfaces. Accordingly, references are made to authoring of an interactive video game user interface by an author and playing of a video game by a player. It should be noted however that this example is non-limiting, and that the present invention is equally applicable in contexts other than the context of video games. Accordingly, the present invention encompasses creating of interactive user interfaces by an author, and interaction with the interactive user interfaces by a user, in contexts other than video games. For example, the references to "gameplay," "game authoring," "game" systems and "player" are non-limiting, and encompass user interaction, user interface authoring, user interface systems, and users in contexts that are utilitarian, or otherwise are outside typical "game" or "video game" contexts. Accordingly, the references to "game" and the like as used herein are illustrative only, and the present invention is not limited in any way to games or video games.

Additionally, computer readable media storing computer readable code for carrying out the method steps identified above is provided. The computer readable media stores code for carrying out subprocesses for carrying out the methods described herein.

A computer program product recorded on a computer readable medium for carrying out the method steps identified herein is provided. The computer program product comprises computer readable means for carrying out the methods described above.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A computer-implemented method for creation of interactive user interfaces that are responsive to user engagement with a computerized interaction system, the method comprising the following implemented by a computerized interface authoring system comprising at least one processor, a display and an input device operatively coupled to the processor, and a memory operatively coupled to the processor and storing instructions executable by the processor for:
    displaying a video content segment on the display of the interface authoring system;
    receiving author input via the input device during display of the video content segment;
    for each author input received, recording occurrence of the author input in association with a time of occurrence of the author input in relation to an elapsed time of display of the video content segment;
    for each author input received, identifying target input representing and directly corresponding in input type and time of input, in relation to an elapsed time of display of the video content segment, to the author's input received during the author's viewing of the video content segment at the interface authoring system; and
    storing a master track associated with the video content segment, the master track identifying the target input as input to be mimicked by the user, during the user's interaction session at the interaction system, by providing matching input matching each target input in input type and time of input, in relation to an elapsed time of display of the video content segment to the user, at the interaction system, during the interaction session.

2. The method of claim 1, wherein the input device comprises a spatial input device for sensing at least one of acceleration in space, physical location in space and physical orientation in space.

3. The method of claim 2, wherein the target input is used to display a prompt to the user to provide the matching input to an interaction system during the interaction session by causing a transformation to be applied to video content displayed in a video display window during the interaction session, the transformation providing a modified view of the video content in which the video content is displayed as misaligned with a display surface of a display environment of the interaction system.

4. The method of claim 3, wherein the modified view of the video content displays the video content as misaligned in at least one of a vertical direction, a horizontal direction, a roll direction, a pitch direction, and a yaw direction.

5. The method of claim 1, wherein the input device comprises a touchscreen, and wherein recording occurrence of the author input comprises recording occurrence of a touch as sensed by the touchscreen.

6. The method of claim 1, wherein the input device comprises a game controller comprising at least one of a joystick, a button and a directional pad, and wherein recording occurrence of the author input comprises recording occurrence of physical manipulation of the game controller as sensed by the processor.

7. The method of claim 1, further comprising:
    displaying an editing graphical user interface window, the editing graphical user interface window displaying playback of the video content segment, and user-manipulable graphical elements representing author inputs and respective times of occurrence of the author inputs recorded in relation to an elapsed time of display of the video content segment.

8. The method of claim 7, wherein displaying an editing graphical user interface window occurs at the interface authoring system.

9. The method of claim 7, wherein receiving author input via the input device during display of the video content segment occurs at the interface authoring system, and wherein displaying an editing graphical user interface window occurs at a game editing system separate from said interface authoring system.

10. The method of claim 1, wherein the matching input is determined to match the target input if the input is sufficiently similar, as determined by specified parameters, such that exact matching of time of input is not required.

11. The method of claim 1, wherein the matching input is determined to match the target input if the input is sufficiently similar, as determined by specified parameters, such that exact matching of type of input is not required.

12. A computer-implemented method for creation of interactive user interfaces that are responsive to user engagement with a computerized interaction system, the method comprising the following implemented by a computerized interface authoring system comprising at least one processor and an input device operatively coupled to the processor, and a memory operatively coupled to the processor and storing instructions executable by the processor for:
  processing video content segment data recorded with an input device, the data comprising telemetry data associated with the video content segment and representing inputs received in time-synchronization with the recorded video content segment;
  for each input received, recording occurrence of the input in association with a time of occurrence of the input in relation to an elapsed time of recording of the video content segment;
  for each input received, identifying target input representing and directly corresponding in input type and time of input, in relation to an elapsed time of recording of the video content segment, to input as reflected in the telemetry data; and
  storing a master track associated with the video content segment, the master track identifying the target input as input to be mimicked by the user, during the user's interaction session at the interaction system, by providing matching input matching each input reflected in the telemetry data in input type and time of input in relation to an elapsed time of display of the video content segment to the user, at the interaction system, during the interaction session, input.

13. An interface authoring system comprising:
  a processor;
  a display operatively coupled to the processor;
  an input device operatively coupled to the processor; and
  a memory operatively coupled to the processor, the memory storing executable instructions that, when executed by the processor, causes the interface authoring system to perform a method for creation of interactive user interfaces that are responsive to user engagement with a computerized interaction system, the method comprising:
  displaying a video content segment on the display of the interface authoring system;
  receiving author input via the input device during display of the video content segment;
  for each author input received, recording occurrence of the author input in association with a time of occurrence of the author input in relation to an elapsed time of display of the video content segment;
  for each author input received, identifying target input representing and directly corresponding in input type and time of input, in relation to display of the video content segment, to the author's input received during the author's viewing of the video content segment at the interface authoring system; and
  storing a master track associated with the video content segment, the master track identifying the target input as input to be mimicked by the user, during the user's interaction session at the interaction system, by providing matching input matching each target input in input type and time of input, in relation to display of the video content segment to the user at the interaction system, during the interaction session.

14. A computer-implemented method for controlling interactive user interfaces to prompt user engagement, the method comprising the following implemented by a computerized interaction system comprising at least one processor, a display and an input device operatively coupled to the processor, and a memory operatively coupled to the processor and storing instructions executable by the processor for:
  displaying a video content segment on the display of the interaction system during an interaction session;
  processing a master track identifying target input for the interaction session, the target input comprising at least one input, a respective time of occurrence in relation to an elapsed time of display of the video content segment, and information for causing display at the interaction system, during the interaction session, of a respective user prompt prompting the user to provide corresponding input to the interaction system;
  displaying, on the display of the interaction system during the interaction session, at least one user prompt at a time corresponding to the respective time of occurrence in relation to the elapsed time of display of the video content segment, the user prompt comprising displaying a modified view of the video content segment in which the video content segment is displayed as misaligned with a display surface within a display environment;
  receiving via the input device of the interaction system, during display of the video content segment, at least one user input;
  comparing the at least one user input, over time, with the target input;
  determining whether the at least one user input is deemed to match the target input; and
  displaying, on the display of the interaction system, an indication of interaction performance as a function of the determination of whether the at least one user input matches the target input.

15. The method of claim 14 wherein the input device comprises a spatial input device for sensing at least one of acceleration in space and physical orientation in space.

16. The method of claim 15, wherein displaying the video content segment comprises display of streamed video data.

17. The method of claim 15, wherein processing the master track identifying target input for the interaction session comprises processing telemetry data associated with the video content segment as input target state information.

18. The method of claim 14, wherein the input device comprises a game controller comprising at least one of a joystick, a button and a directional pad, and wherein recording occurrence of the author input comprises recording occurrence of physical manipulation of the game controller as sensed by the processor.

19. The method of claim 14, wherein displaying at least one user prompt comprises displaying a modified view of video content in which the video content is displayed as misaligned with a display surface within a display environment provided by the interaction system.

20. The method of claim 19, wherein the modified view of the video content displays the video content as misaligned in at least one of a vertical direction, a horizontal direction, a roll direction, a pitch direction, and a yaw direction.

21. The method of claim 18, wherein displaying at least one user prompt comprises displaying a modified view of video content in which the video content is displayed as misaligned with an area of the display device of the interaction system.

22. An interaction system comprising:
a processor;
a display operatively coupled to the processor;
an input device operatively coupled to the processor; and
a memory operatively coupled to the processor, the memory storing executable instructions that, when executed by the processor, causes the interaction system to perform a method for controlling interactive user interfaces to prompt user engagement, the method comprising:
displaying a video content segment on the display of the interaction system during an interaction session;
processing a master track identifying target input for the interaction session, the target input being defined as at least one user input having an input type and a respective time of occurrence in relation to display of the video content segment at the interaction system, during the interaction session;
receiving via the input device of the interaction system, during display of the video content segment, at least one user input having at least one time of occurrence;
comparing the at least one user input, and its respective time of occurrence, with the target input;
and
displaying, on the display of the interaction system, an indication of interaction performance as a function of the comparison of the at least one user input to the target input.

23. A computer program product for implementing a method for creation of interactive user interfaces that are responsive to user engagement with a computerized interaction system, the computer program product comprising a non-transitory computer-readable medium storing executable instructions that, when executed by a processor, cause a computerized interface authoring system to perform a method comprising:
displaying a video content segment on the display of the interface authoring system;
receiving author input via the input device during display of the video content segment;
for each author input received, recording occurrence of the author input in association with a time of occurrence of the author input in relation to an elapsed time of display of the video content segment;
for each author input received, identifying target input representing and directly corresponding in input type and time of input, in relation to an elapsed time of display of the video content segment, to the author's input received during the author's viewing of the video content segment at the interface authoring system; and storing a master track associated with the video content segment, the master track identifying the target input as to be mimicked by the user, during the user's interaction session at the interaction system, by providing matching input matching each target input in input type and time of input, in relation to an elapsed time of display of the video content segment to the user at the interaction system, during the interaction session.

24. The interaction system of claim 23, wherein processing the master track identifying target input for the interaction session further comprises identifying target input defined as information for causing display at the interaction system, during the interaction session, of a respective user prompt prompting the user to provide corresponding input to the interaction system, the method further comprising:
displaying, on the display of the interaction system during the interaction session, at least one user prompt to provide input having a respective type of input matching an input type of at least one input during the interface authoring session at a time corresponding to the respective time of occurrence of the at least one input in relation to the elapsed time of display of the video content segment.

25. The interaction system of claim 23, wherein the inputs during an interface authoring session comprise an author's input provided during the author's viewing of the video content segment at the interface authoring system.

26. The interaction system of claim 23, wherein the inputs during an interface authoring session comprise inputs reflected in telemetry data associated with the video content segment.

27. A computer program product for implementing a method for controlling interactive user interfaces to prompt user engagement, the computer program product comprising a non-transitory computer-readable medium storing executable instructions that, when executed by a processor, cause a computerized interaction system to perform a method comprising:
displaying a video content segment on the display of the interaction system during an interface session;
processing a master track identifying target input for the interaction session, the target input being defined as at least one user input having an input type and a respective time of occurrence in relation to display of the video content segment at the interaction system, during the interaction session;
receiving via the input device of the interaction system, during display of the video content segment, at least one user input having at least one time of occurrence;
comparing the at least one user input, and its respective time of occurrence, with the target input;
and
displaying, on the display of the interaction system, an indication of interaction performance as a function of the comparison of the at least one user input to the target input.

* * * * *